(12) United States Patent
Ma et al.

(10) Patent No.: US 8,962,210 B2
(45) Date of Patent: Feb. 24, 2015

(54) MODULAR FUEL CELL STACK ASSEMBLY INCLUDING ANODE GAS OXIDIZER AND INTEGRATED EXTERNAL MANIFOLDS FOR USE IN FUEL CELL STACK MODULES

(75) Inventors: Zhiwen Ma, Golden, CO (US); Mohammad Farooque, Danbury, CT (US); Ramakrishnan Venkataraman, Danbury, CT (US); Michael Cramer, New Milford, CT (US); Alan Barlow, Ridgefield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 729 days.

(21) Appl. No.: 12/996,437

(22) PCT Filed: Jun. 5, 2009

(86) PCT No.: PCT/US2009/046346
§ 371 (c)(1),
(2), (4) Date: Dec. 6, 2010

(87) PCT Pub. No.: WO2009/149314
PCT Pub. Date: Dec. 10, 2009

(65) Prior Publication Data
US 2011/0081592 A1  Apr. 7, 2011

Related U.S. Application Data

(60) Provisional application No. 61/059,606, filed on Jun. 6, 2008.

(51) Int. Cl.
*H01M 8/24* (2006.01)
*H01M 8/04* (2006.01)

(52) U.S. Cl.
CPC ........ *H01M 8/2475* (2013.01); *H01M 8/04089* (2013.01); *H01M 8/2465* (2013.01); *H01M 8/249* (2013.01); *H01M 8/2485* (2013.01); *Y02E 60/50* (2013.01)
USPC ........................................................ 429/460

(58) Field of Classification Search
None
See application file for complete search history.

(56) References Cited

U.S. PATENT DOCUMENTS

| | | | |
|---|---|---|---|
| 4,476,196 A | 10/1984 | Poeppel | |
| 4,738,905 A * | 4/1988 | Collins | .......................... 429/460 |
| 6,110,612 A | 8/2000 | Walsh | |
| 6,200,696 B1 | 3/2001 | Farooque et al. | |
| 6,410,177 B1 * | 6/2002 | Iyasu et al. | .................... 429/434 |
| 7,070,874 B2 | 7/2006 | Blanchet et al. | |
| 7,323,270 B2 | 1/2008 | Patel et al. | |
| 2003/0162075 A1 | 8/2003 | Gorbell | |
| 2003/0235740 A1 * | 12/2003 | Haltiner et al. | ................. 429/34 |
| 2006/0035135 A1 | 2/2006 | Patel et al. | |
| 2010/0227234 A1 | 9/2010 | Ma et al. | |

FOREIGN PATENT DOCUMENTS

| | | | |
|---|---|---|---|
| JP | 59219866 A | * | 12/1984 |
| JP | 07-254427 A | | 10/1995 |
| JP | 204006383 A1 | | 1/2004 |
| JP | 2004327130 A1 | | 11/2004 |
| KR | 10 2005 0048275 A | | 5/2005 |

OTHER PUBLICATIONS

The above patent documents US Patent 1, US Publication 1 and all foreign patent documents were cited the International Search Report of PCT/US2009/046346 Jun. 5, 2008.
Supplementary European Search Report issued on Aug. 4, 2014, issued in the corresponding European Patent Application No. 09759473.3.

* cited by examiner

*Primary Examiner* — Barbara Gilliam
*Assistant Examiner* — Stephan Essex
(74) *Attorney, Agent, or Firm* — Cowan, Liebowitz & Latman, P.C.

(57) ABSTRACT

A modular fuel cell stack assembly comprising a plurality of fuel cell stacks, each of the stacks having a plurality of stack faces and a plurality of stack corners formed between the stack faces, wherein the plurality of stack faces include a cathode inlet face adapted to receive oxidant gas for use in a cathode side of the fuel cell stack, a cathode outlet face adapted to output cathode exhaust from the cathode side, an anode inlet face adapted to receive fuel for use in an anode side of the fuel cell stack and an anode outlet face adapted to output anode exhaust from the anode side, and wherein at least one of the cathode inlet face, cathode outlet face, anode inlet face and anode outlet face is an open face without a manifold, and a containment structure for housing the plurality of fuel cell stacks and for providing fuel and oxidant gas to said fuel cell stacks, the containment structure including at least one sealed chamber for sealingly enclosing and isolating at least one open face. Also provided is a modular fuel cell assembly comprising a plurality of fuel cell stacks, an oxidizer disposed centrally of the fuel cell stacks and adapted to receive anode exhaust from the fuel cell stacks, to generate oxidant gas using the anode exhaust and to distribute the oxidant gas to the fuel cell stacks, and a containment structure for housing the plurality of fuel cell stacks and the oxidizer and adapted to receive fuel and distribute the fuel to the fuel cell stacks.

31 Claims, 7 Drawing Sheets

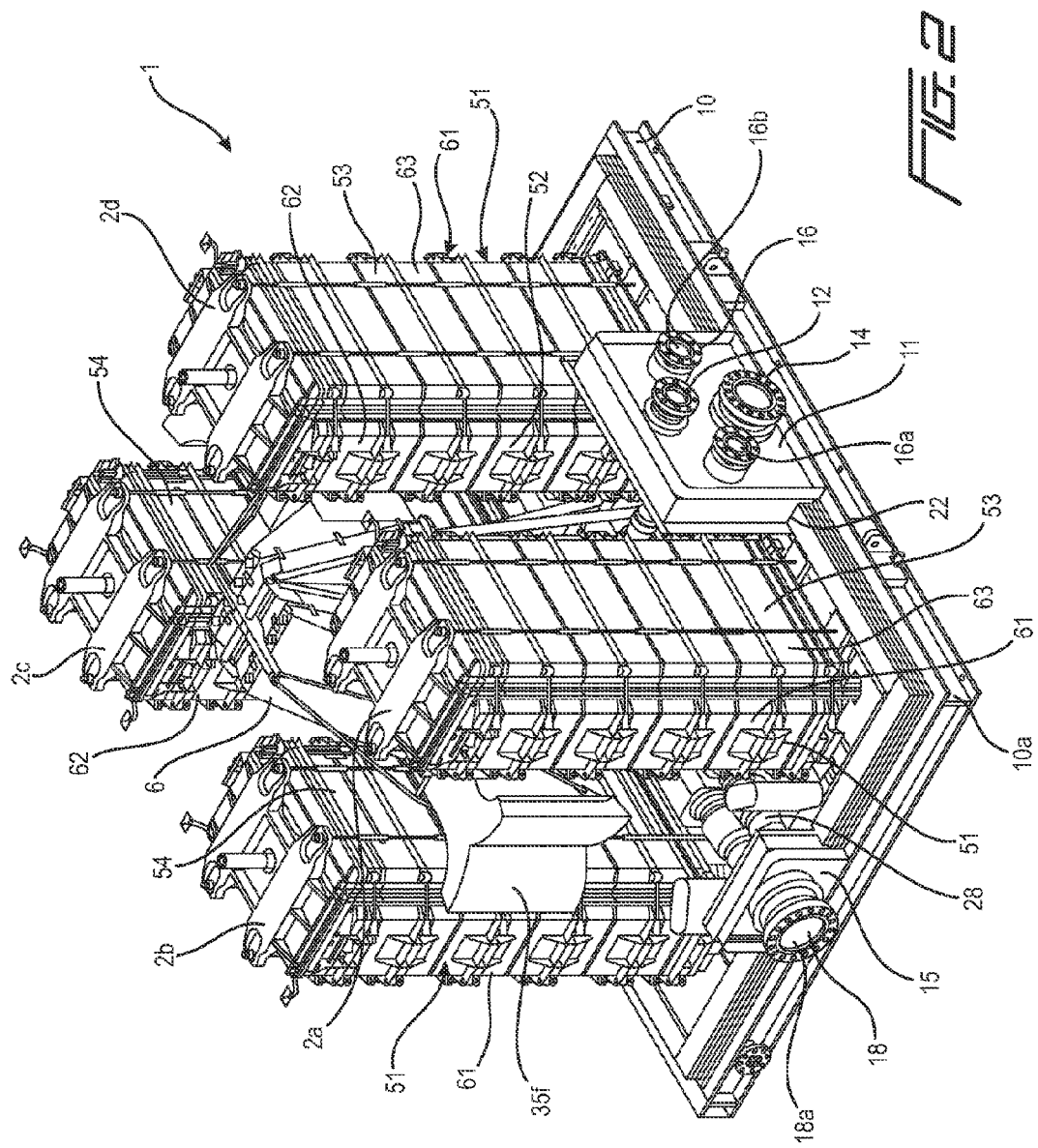

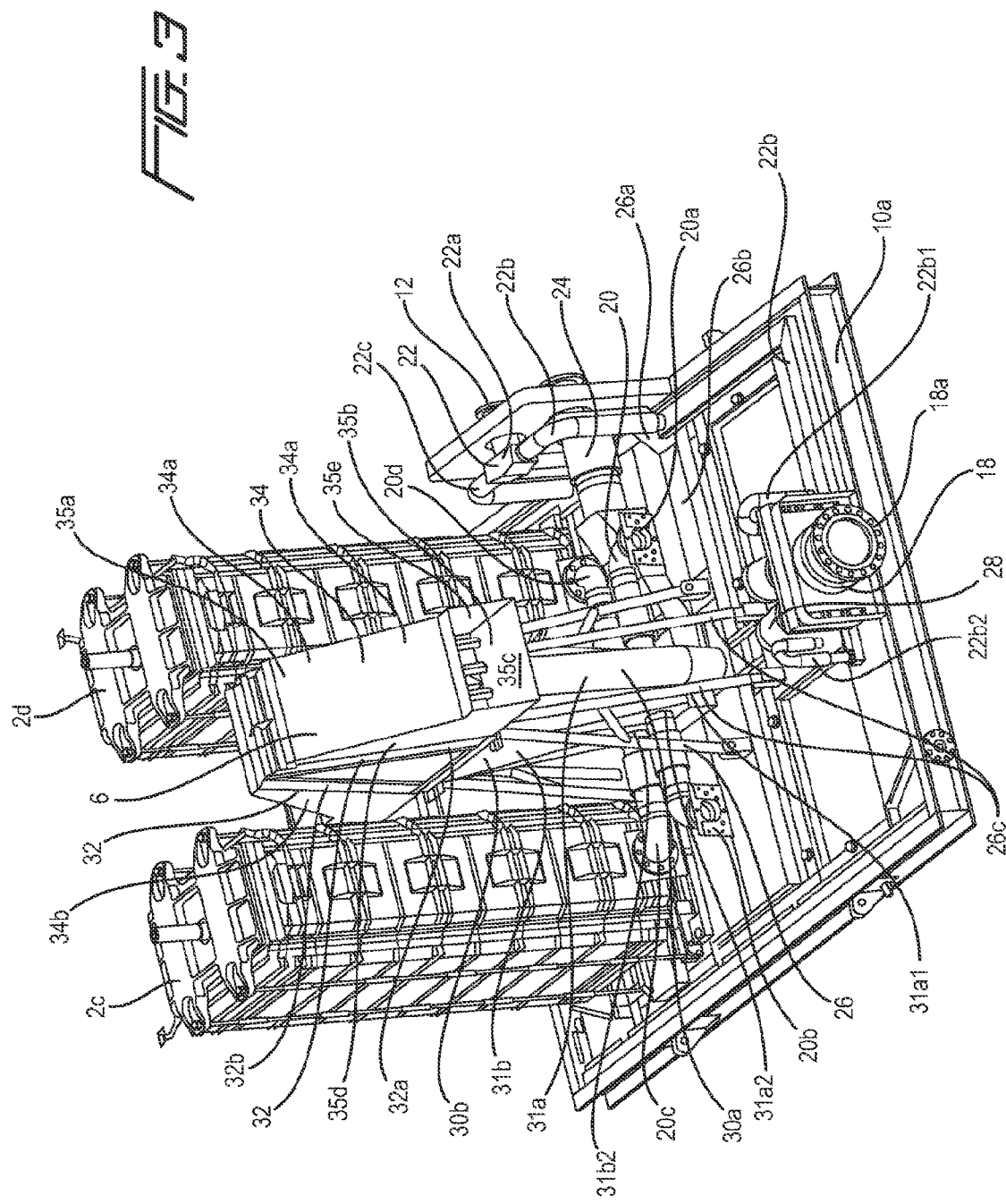

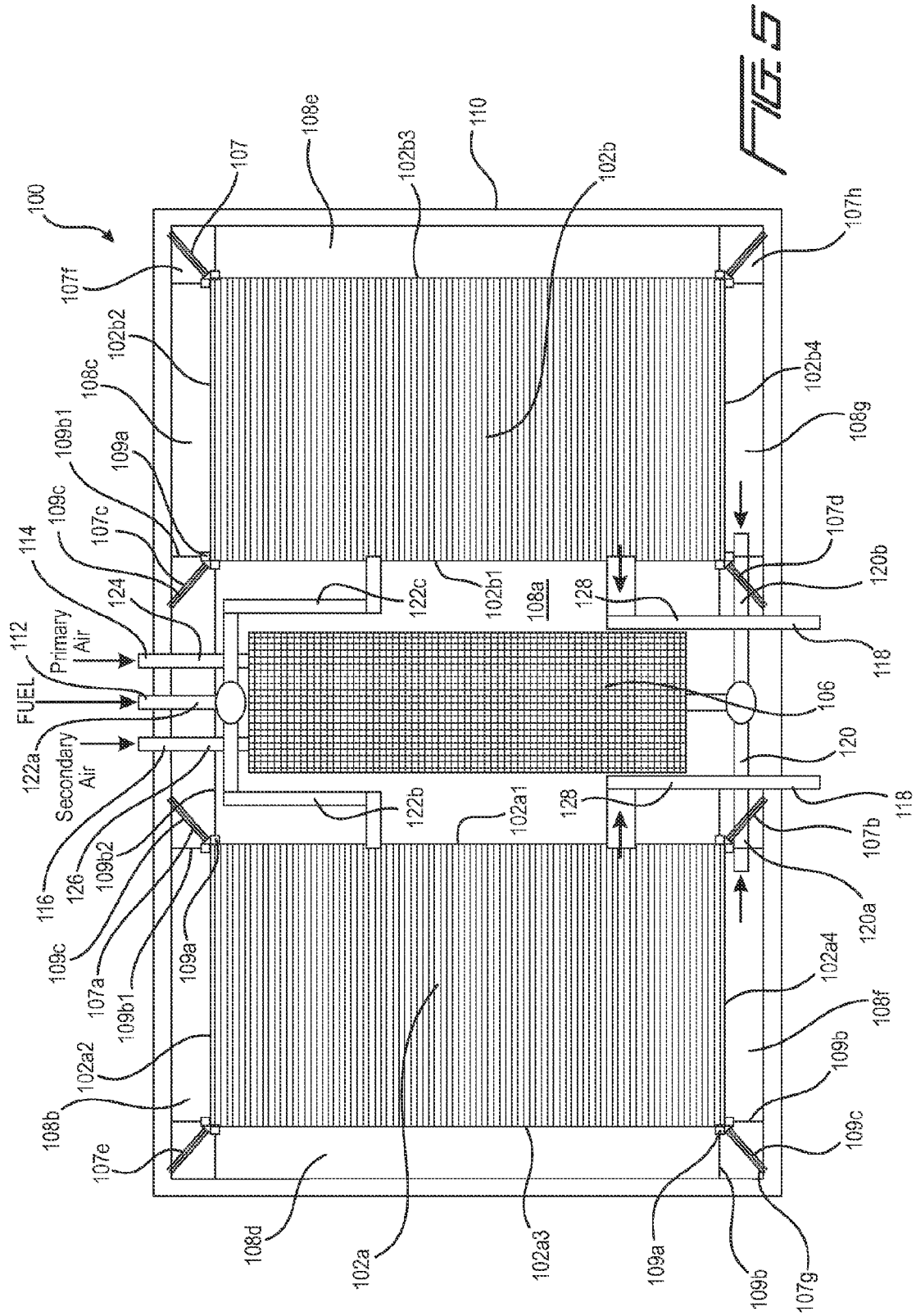

MODULAR FUEL CELL STACK ASSEMBLY INCLUDING ANODE GAS OXIDIZER AND INTEGRATED EXTERNAL MANIFOLDS FOR USE IN FUEL CELL STACK MODULES

CROSS-REFERENCE TO RELATED APPLICATIONS

This application is a national phase of International Application No. PCT/US2009/046346 filed on Jun. 5, 2009, which claims benefit under 35 USC 119(e) of U.S. provisional application No. 61/059,606, filed on Jun. 6, 2008, the entire disclosures of which are hereby incorporated by reference.

BACKGROUND OF THE INVENTION

This invention relates to fuel cell systems and, more particularly, to multi-stack fuel cell systems.

In building fuel-cell systems, the fuel cells are conventionally stacked one on the other to form a fuel-cell stack. The number of cells determines the power rating of the stack and to provide systems with higher power ratings, a number of fuel-cell stacks are utilized and the outputs of the fuel cell stacks combined to provide the desired power output.

In one type of a multi-stack fuel cell system, a modular multi-stack fuel cell assembly includes a plurality of fuel cell stacks housed within a rectangular or box-like enclosure and arranged in line along the length of the enclosure. Each of the stacks within the enclosure has inlet manifolds for receiving the fuel and oxidant gas needed to operate the stack and outlet manifolds for outputting exhaust fuel and oxidant gases from the stack. The enclosure includes fuel and oxidant gas inlet ports for communicating through piping or conduits with the respective fuel and oxidant gas inlet manifolds of the stacks, and fuel and oxidant gas outlet ports for communicating through piping with the oxidant and fuel gas outlet manifolds.

In such system, in order to insure an appropriate uniform flow distribution and a desired pressure differential through the stacks, flow baffles are provided in the piping or conduits connecting the fuel and oxidant gas inlet ports to the respective stack inlet manifolds. Each of the stacks and the piping within the enclosure are also insulated to thermally isolate the stacks from the enclosure. The cold box-like design of the enclosure requires thermal expansion joints inside as well as outside of the enclosure to minimize the pressure differential across the fuel and oxidant seals. Nitrogen is also provided to purge any minute leaks from the fuel cell stacks into the enclosure.

While modular multi-stack fuel cell assemblies of the above type performed as desired, the piping and baffle requirements made each assembly complex and expensive. The thermal insulation requirements were also stringent, further adding to the cost of each assembly. Additionally, the need for a nitrogen gas purge added another gas stream increasing the process control requirements. These factors have lead designers to look for less complex and less costly design alternatives.

U.S. Pat. No. 7,323,270, assigned to the same assignee herein, describes an improved modular multi-stack fuel-cell assembly, in which stack flow distribution and differential pressure requirements are realized in a simpler and more cost effective manner, and in which input and output port and piping requirements are significantly reduced. The '270 patent discloses a modular multi-stack fuel cell assembly in which the stacks are situated within an enclosure or a containment structure and which includes a gas distributor within the structure for distributing received fuel gas to the stacks and for receiving exhausted fuel and oxidant gases from the stacks. The gas distributor is disposed symmetrically and centrally of the fuel cell stacks within the structure so as to promote desired uniform gas flow and uniform pressure differential through the stacks. The distributor in the '270 patent includes a first section for distributing received fuel to manifolds of each of the fuel cell stacks through equal length conduits, a second section for receiving exhausted fuel gas from each of the stacks through equal length conduits and a third section for receiving exhausted oxidant gas from each of the stacks through equal length conduits.

It is desired to provide a more advanced modular multi-stack assembly for improved reliability and greater accessibility and serviceability so as to reduce the manufacturing and maintenance costs of the assembly, extend the life of the assembly and to improve its performance. It is also desired to provide an improved modular multi-stack assembly with a space-saving design that allows use of anode exhaust gas within the assembly to generate oxidant gas for use in fuel cell cathode compartments.

It is therefore an object of the present invention to provide a further simplified modular multi-stack assembly in which oxidant gas is supplied to an oxidant inlet face of each fuel cell stack through an oxidizer assembly within the modular assembly.

It is a further object of the invention to provide a modular multi-stack assembly which includes at least one oxidizer unit within the enclosure adapted to receive anode exhaust and input oxidant gas and to output oxidant gas for use in the cathode side of the stacks.

It is also an object of the present invention to provide a modular multi-stack assembly in which a plurality of sealed regions are formed within its enclosure for improved gas separation and distribution within the assembly.

SUMMARY OF THE INVENTION

The above and other objectives are realized in a modular multi-stack fuel cell assembly comprising a plurality of fuel cell stacks, each of the fuel cell stacks having a plurality of stack faces and a plurality of stack corners formed between the stack faces, wherein the plurality of stack faces include a cathode inlet face adapted to receive oxidant gas for use in a cathode side of the fuel cell stack, a cathode outlet face adapted to output cathode exhaust from the cathode side, an anode inlet face adapted to receive fuel for use in an anode side of the fuel cell stack and an anode outlet face adapted to output anode exhaust from the anode side, and wherein at least one of the cathode inlet face, cathode outlet face, anode inlet face and anode outlet face is an open face without a manifold, and a containment structure for housing the plurality of fuel cell stacks and for providing fuel and oxidant gas to the fuel cell stacks, wherein the containment structure includes at least one sealed chamber for sealingly enclosing and isolating at least one open face. The modular fuel cell stack assembly further comprises a sealing assembly for forming the at least one sealed chamber within the containment structure, the sealing assembly comprising a plurality of seals, each of which includes a seal press assembly adapted to be applied to a stack corner adjacent said at least one said open face, a spring member for providing a force so as to retain the seal press assembly at the stack corner and at least one separating member sealingly coupled with the seal press assembly.

In certain embodiments of the modular fuel cell stack assembly each of the cathode inlet face, the cathode outlet face, the anode inlet face and the anode outlet face is an open face and does not include a manifold, and the containment structure includes at least one sealed cathode inlet chamber for sealingly enclosing and isolating the cathode inlet faces of said stacks, at least one sealed cathode outlet chamber for sealingly enclosing and isolating the cathode outlet faces of the stacks, at least one sealed anode inlet chamber for sealingly enclosing and isolating the anode inlet faces of the stacks, and at least one sealed anode outlet chamber for sealingly enclosing and isolating the anode outlet faces of the stacks. In some embodiments, the cathode inlet chamber is a common cathode inlet chamber that encloses all of the cathode inlet faces of the stacks and the modular fuel cell stack assembly further includes an oxidizer centrally disposed within the common cathode inlet chamber.

In certain embodiments, the seals used for forming the cathode inlet, cathode outlet, anode inlet and anode outlet chambers include one of at least a first seal construction used for sealing first corners and a second seal construction used for sealing second corners. Second corners include stack corners adjacent to the anode inlet and cathode inlet faces and the seals of the second seal construction are used for forming the cathode inlet chamber and the anode inlet chambers.

In other embodiments, the modular fuel cell stack assembly comprises a plurality of fuel cell stacks adapted to receive fuel and oxidant gas and to output anode exhaust and cathode exhaust, an oxidizer assembly disposed centrally of the fuel cell stacks, the oxidizer being adapted to receive anode exhaust from the fuel cell stacks, to generate the oxidant gas using the anode exhaust and to output the oxidant gas for use in the fuel cell stacks, and a containment structure for housing the plurality of fuel cell stacks and the oxidizer assembly and adapted to receive fuel and distribute said fuel to said fuel cell stacks. In such embodiments, each of the fuel cell stacks includes a cathode inlet face which is an open face without a manifold, and the oxidizer assembly outputs the oxidant gas into the containment structure for use by the fuel cell stacks. The fuel cell stacks are disposed within the containment structure so that the cathode inlet face of each fuel cell stack faces the oxidizer assembly. The oxidizer assembly is further adapted to receive air for generating the oxidant gas and comprises at least one mixer-eductor assembly adapted to receive the anode exhaust and a first air portion and to mix said anode exhaust with the first air portion, at least one oxidizer unit including an oxidizer catalyst for oxidizing the mixture of the anode exhaust with the first air portion to generate hot oxidant gas, and at least one output assembly directly following the at least one oxidizer unit and adapted to receive the hot oxidant gas and a second air portion for cooling the hot oxidant gas and to output the oxidant gas. The mixer-eductor assembly comprises an eductor tube extending in an upward direction, which includes a first inlet for receiving the anode exhaust, a second inlet for receiving the first air portion and an outlet for outputting the mixture of said anode exhaust and said first air portion to said oxidizer unit, and wherein said first and second inlets are disposed at a lower end of said eductor tube, said second inlet being disposed at a lower point of the eductor tube than the first inlet, and the outlet being disposed at an upper end of the eductor tube.

BRIEF DESCRIPTION OF THE DRAWINGS

The above and other features and aspects of the present invention will become more apparent upon reading the following detailed description in conjunction with the accompanying drawings, in which:

FIG. 2 shows a perspective view of the modular multi-stack fuel cell assembly of FIG. 1 with upper enclosure of the containment structure removed;

FIG. 3 shows a perspective view of the modular multi-stack fuel cell assembly of FIG. 2 with two fuel cell stacks and the upper enclosure of the containment structure removed;

FIG. 5 shows a modular multi-stack fuel cell assembly with two fuel cell stacks housed by a containment structure that forms a plurality of sealed areas using a plurality of sealing assemblies;

DETAILED DESCRIPTION

Figure 1:
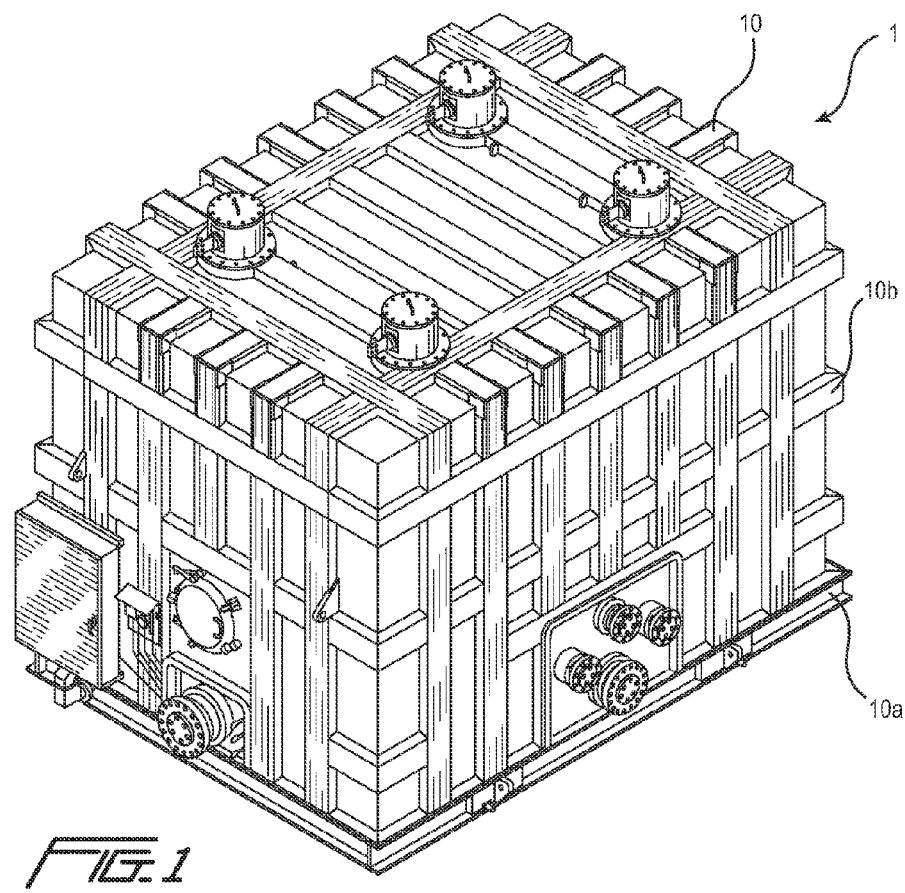
FIG. 1 shows a perspective 3-dimensional view of a modular multi-stack fuel cell assembly including four fuel cell stacks housed by a containment structure.

FIGS. 1-4 show various views of an illustrative embodiment of a modular multi-stack fuel cell assembly 1 including a plurality of fuel cell stacks 2, shown as stacks 2a, 2b, 2c and 2d, and an oxidizer assembly 6. The plurality of fuel cell stacks 2 and the oxidizer assembly 6 are housed within a common containment structure 10 which includes a base section 10a and an upper enclosure 10b. To permit viewing of the other components of the assembly 1, the upper enclosure which surrounds and encloses the stacks and the oxidizer has been removed in FIGS. 2-4. To further clarify the central components of the assembly 1, stacks 2a and 2b are not shown in FIG. 3, but can be seen in FIGS. 1, 2 and 4.

As shown in FIGS. 1-3, the stacks 2a-2d each extend height-wise in the vertical direction and are supported on the base section 10a of the containment structure 10. The fuel cell stacks 2a-2d are adapted to receive fuel and oxidant gas and to output anode exhaust and cathode exhaust. The oxidizer assembly 6 is disposed centrally relative to the stacks 2a-2d and is adapted to receive anode exhaust outputted by the stacks 2a-2d and to generate oxidant gas for use in the stacks 2a-2d. As discussed in more detail herein below, the oxidizer assembly 6 is also adapted to receive a first portion of air, or primary air, for mixing with the anode exhaust in the assembly 6 and for generating the oxidant gas, and a second portion of air, or secondary air, for cooling the oxidant gas generated in the assembly 6.

As shown in FIG. 1, the containment structure 10 includes an upper enclosure 10b which surrounds and encloses the fuel cell stacks 2a-2d and the oxidizer assembly 6. The containment structure 10 also includes a plurality of ports for receiving inlet fuel and air for use in the stacks 2a-2d and the oxidizer assembly 6 and for outputting cathode exhaust produced by the stacks, which can be viewed in FIGS. 1-4. As shown, the containment structure 10 includes a fuel inlet port 12 for receiving and inputting fuel, a primary air inlet port 14 for receiving and inputting primary air, at least one secondary air inlet port 16 for receiving and inputting secondary air and at least one cathode exhaust outlet port 18 for receiving cathode exhaust output by the fuel cell stacks and outputting the cathode exhaust from the assembly 1. In the illustrative embodiment shown in FIGS. 1-4, the containment structure includes two secondary air inlet ports 16*a*, 16*b* and two cathode exhaust outlet ports 18*a*, 18*b*. However, the number of inlet and outlet ports 12, 14, 16, 18 may vary depending on the configuration and requirements of the fuel cell stacks and the oxidizer assembly.

Figure 4:
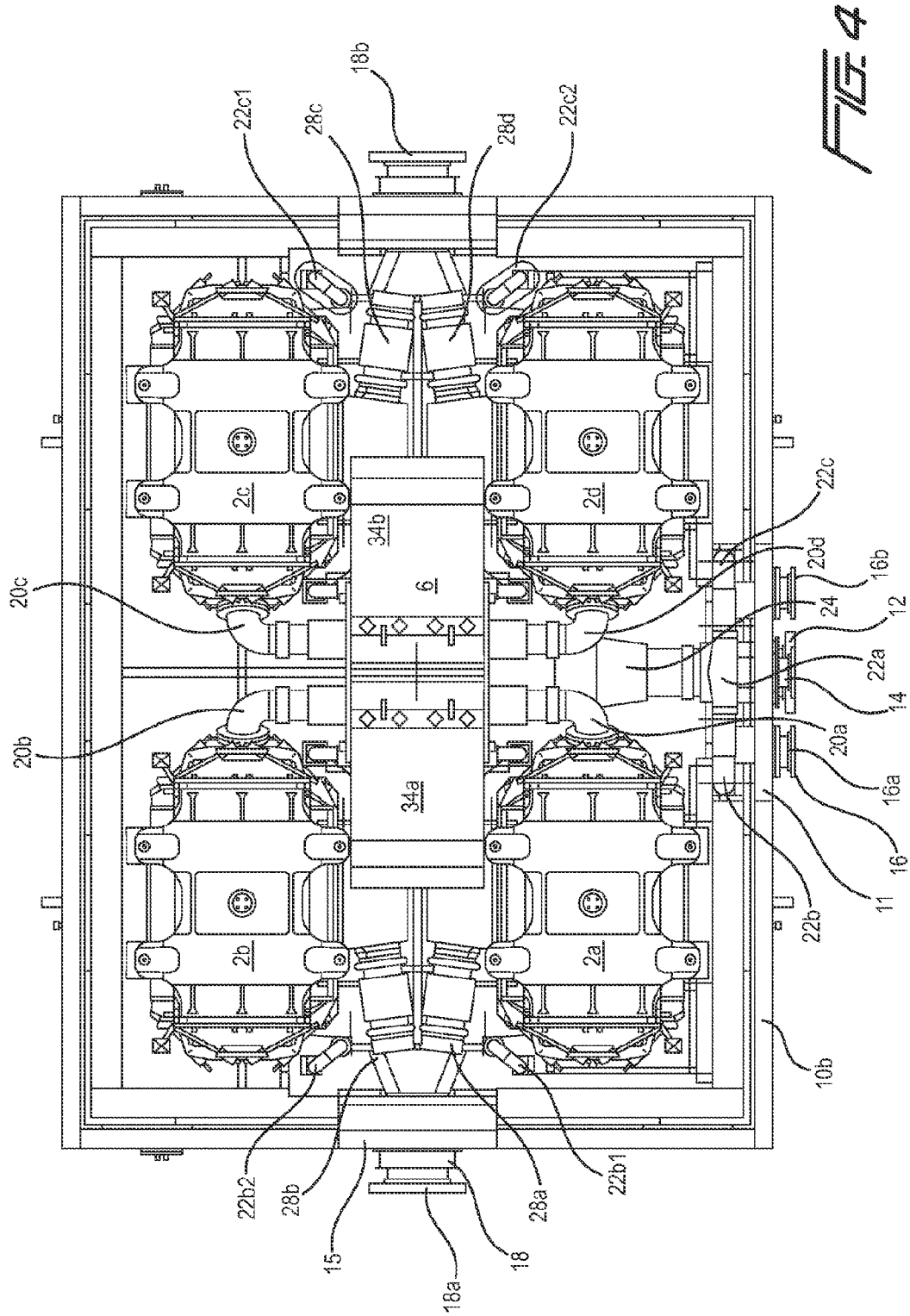
FIG. 4 shows a top view of the modular multi-stack fuel cell assembly of FIG. 2.

In FIGS. 1-4, the inlet ports 12, 14 and 16*a*, 16*b* form an inlet port assembly in a first face of the containment structure 10 comprising an inlet tombstone 11, or an inlet port supporting structure, that supports the inlet ports 12, 14 and 16*a*, 16*b*. As also shown, the outlet port 18*a* is formed as an outlet port assembly in a second face of the containment structure 10 adjacent to the first face, the outlet port assembly comprising an outlet tombstone 15, or an outlet port supporting structure, for supporting the outlet port 18*a*. As shown in FIGS. 3 and 4, another outlet port assembly of like construction may be formed in a third face of the containment structure 10 opposing the second face, so that each outlet port assembly is used for outputting a portion of the cathode exhaust produced in the fuel cell stacks.

As shown in FIGS. 2-4, the assembly 1 also comprises a conduit assembly that includes piping or conduits for coupling the inlet and outlet ports 12 and 18 with the respective portions of the fuel cell stacks 2*a*-2*d* and piping or conduits for coupling the inlet ports 14, 16 with respective portions of the oxidizer assembly 6. In particular, the conduit assembly includes fuel inlet piping or conduit assembly 22 for coupling the inlet port 12 with each of the fuel cell stacks 2*a*-2*d* so that the fuel input into the assembly 1 through the inlet port 12 is received by the fuel inlet conduits assembly 22 and distributed or supplied by the conduit to each of the fuel cell stacks 2*a*-2*d*. In the illustrative embodiment shown in FIGS. 3 and 4, the fuel inlet conduit assembly 22 receives the input fuel from the inlet port 12 through a first conduit 22*a*, which is divided or split into two conduits 22*b* and 22*c* each of which receives a portion of the fuel and conveys the respective fuel portion to a fuel cell stack pair. As shown, the conduit 22*b* conveys a first portion of the fuel to one fuel cell stack pair including fuel cell stacks 2*a* and 2*b*, while the conduit 22*c* conveys a second portion of the fuel to the other fuel cell stack pair including fuel cell stacks 2*c* and 2*d*. Each conduit 22*b* and 22*c* is thereafter split or divided into two conduits 22*b*1, 22*b*2 and 22*c*1 and 22*c*2, each of which is coupled to a respective fuel cell stack and conveys the respective fuel portion to the fuel cell stack. Thus, in the illustrative embodiment shown in FIGS. 3 and 4, the conduit 22*b*1 and 22*b*2 convey fuel to fuel cell stacks 2*a* and 2*b*, respectively, and the conduits 22*c*1 and 22*c*2 convey fuel to fuel cell stacks 2*c* and 2*d*. As shown in FIGS. 1-4, the conduits 22*b* and 22*c* have equal or substantially equal lengths and diameters, and the conduits 22*b*1, 22*b*2, 22*c*1 and 22*c*2 also have equal or substantially equal lengths and diameters so that the fuel input into the assembly 1 is divided into substantially equal portions supplied to the stacks 2*a*-2*d*. Fuel received in each stack 2*a*-2*d* through the respective conduits 22*b*1, 22*b*2, 22*c*1 and 22*c*2 is conveyed to an end plate assembly of the respective fuel cell stack where it is pre-heated using heat from cathode exhaust before being used in the anode side of the respective stack.

As shown in FIGS. 2-4, the cathode exhaust outlet ports 18 are coupled with the respective fuel cell stacks 2*a*-2*d* using cathode exhaust piping or conduit assembly 28. In the embodiment shown, the first outlet port 18*a* is coupled with the first fuel cell stack 2*a* using a first cathode exhaust conduit 28*a* and with the second fuel cell stack 2*b* using a second cathode exhaust conduit 28*b*. The second outlet port 18*b* is coupled with the third fuel cell stack 2*c* using a third cathode exhaust conduit 28*c* and with the fourth fuel cell stack 2*d* using a fourth cathode exhaust conduit 28*d*. In the illustrative embodiment shown in FIGS. 1-4, the cathode exhaust conduits 28*a*-28*d* have equal or substantially equal lengths and diameters so that the cathode exhaust from the stacks 2*a*-2*d* is exhausted at substantially equal flow rates. In each of the fuel cell stacks 2*a*-2*d*, cathode exhaust is first passed through the end plate of the stack where the heat from the cathode exhaust is used for preheating fuel supplied from the conduits 22*b*1, 22*b*2, 22*c*1 and 22*c*2, and is thereafter outputted to the respective cathode exhaust conduit 28*a*-28*d*, each of which conveys the cathode exhaust to the corresponding outlet port 18*a*, 18*b*.

As shown in FIGS. 2-4, the primary air inlet port 14 is coupled with the oxidizer assembly 6 using primary air piping or conduit assembly 24 which conveys the primary air from the inlet port 14 to the oxidizer assembly 6. Each of the secondary air inlet ports 16*a*, 16*b* is coupled with the oxidizer assembly 6 using a secondary air piping or conduit assembly 26. The configuration and coupling of the primary air conduit assembly 24 and the secondary air conduit assembly with the oxidizer assembly 6 will be described in more detail herein below.

The assembly 1 further includes anode exhaust piping or conduit assembly 20 for coupling the fuel cell stacks 2*a*-2*d* with the oxidizer assembly 6 to convey anode exhaust outputted from each of the stacks 2*a*-2*d* to the oxidizer assembly 6. In particular, the anode exhaust conduit assembly 20 includes a first anode exhaust conduit 20*a* for conveying anode exhaust outputted from the first fuel cell stack 2*a* to the oxidizer assembly 6, a second anode exhaust conduit 20*b* for conveying anode exhaust from the second fuel cell stack 2*b* to the oxidizer assembly 6, a third anode exhaust conduit 20*c* for conveying anode exhaust from the third fuel cell stack 2*c* to the oxidizer assembly and a fourth anode exhaust conduit 20*d* for conveying anode exhaust from the fourth fuel cell stack 2*d* to the oxidizer assembly 6. In the illustrative embodiment shown in FIGS. 1-4, the conduits 20*a*-20*d* have equal, or substantially equal, lengths.

The oxidizer assembly 6 and the conduit assemblies 22, 24, 26 and 28 are adapted to promote desired uniform gas flow and desired uniform pressure differential through the stacks 2*a*-2*d*. In the embodiment shown in FIGS. 1-4, this is accomplished by disposing the oxidizer assembly 6 symmetrically and centrally of the stacks. In addition, the use of equal length conduits 22*b* and 22*c* and of equal length conduits 22*b*1, 22*b*2, 22*c*1 and 22*c*2 for providing fuel to the stacks 2*a*-2*d*, of equal length conduits 20*a*-20*d* for conveying anode exhaust to the oxidizer assembly 6 and of equal length conduits 28*a*-28*b* for conveying cathode exhaust to the cathode outlet port 18 further promotes uniform gas flow and uniform pressure differential through the stacks 2*a*-2*d* of the assembly 1. As a result, the need for additional components to provide pressure differential and gas flow uniformity is significantly reduced and the overall energy losses associated with the flow distribution are also minimized.

As shown in FIGS. 1-4, the oxidizer assembly 6 has a height-wise configuration which is best viewed in FIG. 3, and includes at least one mixer-eductor assembly 30 adapted for receiving and mixing anode exhaust and primary air, and at least one oxidizer unit 32, including oxidizer catalyst, for oxidizing the mixture of the anode exhaust and primary air to produce oxidant gas. The oxidizer assembly 6 also includes an oxidant output portion 34 following the oxidizer unit 32, which is configured as a hood shown in FIGS. 1-4. The output hood 34 immediately follows the oxidizer unit 32 so as to receive oxidant gas produced by the oxidizer unit 32, and is also adapted to receive secondary air and to provide mixing between oxidant gas from the oxidizer unit 32 and the secondary air. As a result, the secondary air cools the oxidant gas from the oxidizer unit 32, and the output hood 34 outputs cooled oxidant gas suitable for use in the cathode sides of the fuel cell stacks 2a-2d.

In the illustrative embodiment shown in FIG. 3, the oxidizer assembly 6 is formed as two like oxidizer assemblies, and includes a first mixer-eductor assembly 30a, a first oxidizer unit 32a, and a first output hood 34a following the first oxidizer unit 32a, and a second mixer-eductor assembly 30b, a second oxidizer unit 32b and a second output hood 34b following the second oxidizer unit 32b. The first mixer eductor assembly 30a is adapted to receive anode exhaust from the first and second stacks 2a, 2b through first and second conduits 20a, 20b, respectively, and a portion of the primary air from the primary air conduit assembly 24, and to mix the anode exhaust with the primary air. The first oxidizer 32a is adapted to receive the mixture of anode exhaust and primary air from the first mixer eductor assembly 30a, and to oxidize the mixture to produce hot oxidant gas. The first output hood 34a is adapted to receive a portion of the secondary air supplied through the conduit assembly 26 and the oxidant gas produced by the first oxidizer 32a and to output a first portion of cooled oxidant gas for use in the cathode side of the stacks 2a-2d. The second mixer-eductor assembly 30b of the oxidant assembly 6 is adapted to receive anode exhaust from the third and fourth stacks 2c and 2d and the other portion of the primary air from the conduit assembly 24, the second oxidizer 32b is adapted to receive the mixture of anode exhaust and primary air from the second mixer eductor assembly 30b, and the second output hood 34b is adapted to receive the other portion of the secondary air supplied via the conduit assembly 26 and the oxidant gas produced by the second oxidizer 32b and to output a second portion of cooled oxidant gas for use in the stacks 2a-2d.

As shown in FIG. 3, the first and second mixer-eductor assemblies 30a, 30b each comprise an eductor tube 31a, 31b, which forms an elongated passage for mixing the anode exhaust and the primary air received by the eductor tube and conveying the mixture of the anode exhaust and primary air to the first and second oxidizer units 32a, 32b, respectively. Each eductor tube 31a, 31b includes an air inlet 31a1, 31b1 for receiving the primary air, or a portion of the primary air, from the conduit assembly 24, and at least one anode exhaust inlet 31a2, 31b2 for receiving the anode exhaust produced by one or more of the stacks 2a-2d from one or more conduits 20a-d. In the illustrative embodiment shown, each eductor tube 31a, 31b receives a portion of the primary air through a primary air inlet 31a1, 31b1 at a lowermost end of the eductor tube 31a, 31b. The first eductor tube 31a also receives anode exhaust from two fuel cell stacks 2a, 2b through the anode exhaust inlets 31a2, while the second eductor tube 31b receives anode exhaust from the other two fuel cell stacks 2c, 2d through the anode exhaust inlets 31b2, wherein each anode exhaust inlet 31a2, 31b2 corresponds to one of the stacks 2a-2d. The anode exhaust inlets 31a2, 31b2 are positioned near the lowermost end of the respective eductor tube 31a, 31b and above the primary air inlet 31a1, 31b1.

The eductor tube 31a, 31b has a relatively long flow length which promotes mixing between the anode exhaust and the primary air and provide a large flow area for the gasses to pass through so as to minimize pressure drop. A suitable flow length of the eductor tube is between 5 and 10 feet. In addition, the eductor tube 31a, 31b is designed so as to increase the velocity and decrease the pressure of the primary air which, as a result, decreases the pressure of the anode exhaust gas at the anode exhaust inlets 31a2, 31b2 and sucks the anode exhaust through the eductor tube 31a, 31b. In this way, the mixing between the anode exhaust and the primary air and the movement of the anode exhaust and primary air mixture through the eductor tube are promoted. An example of a mixer-eductor assembly is disclosed in U.S. Pat. No. 6,902,840, assigned to the same assignee herein, and incorporated herein by reference. The mixer-eductor assembly disclosed in the '840 patent, which has a horizontal configuration, can be adapted for use as the vertically-oriented, or upright, eductor tube 31a, 31b in the oxidizer assembly 6 of FIGS. 1-4.

The first and second oxidizer units 32a, 32b directly follow the first and second mixer-eductor assemblies 30a, 30b, respectively, so that the mixture of anode exhaust and primary air from the eductor tube of each mixer-eductor assembly is passed through the respective oxidizer unit 32a, 32b. Each of the first and second oxidizer units 32a, 32b comprises a catalyst bed including oxidizing catalyst so that when the mixture of the anode exhaust and primary air is passed through the catalyst bed, the anode exhaust undergoes an oxidizing reaction with the primary air to oxidize any hydrocarbon fuel remaining in the anode exhaust and to produce oxidant gas. In the illustrative configuration shown in FIG. 3, the catalyst bed of each of the first and second oxidizer units 32a, 32b is disposed at or near the outlet of the respective eductor tube 31a, 31b, at an angle relative to the direction of the gas flow along the eductor tube. In particular, the catalyst bed of each oxidizer unit 32a, 32b is disposed such that the width of the respective eductor tube 31a, 31b gradually decreases in an upward direction. This positioning of the catalyst bed of the oxidizer unit 32a, 32b provides a larger surface area of the catalyst bed that is exposed to, and comes into contact with, the anode exhaust and primary air mixture and minimizes pressure differential along the catalyst bed of the oxidizer.

As mentioned herein above, oxidant gas produced in each oxidizer unit 32a, 32b is outputted into the respective output hood 34a, 34b of the oxidizer assembly. The output hoods 34a, 34b are also adapted to receive all or a portion of the secondary air supplied by the conduit assembly 26. Each output hood 34a, 34b is designed so as to promote mixing between the oxidant gas outputted from the respective oxidizer unit 32a, 32b and the secondary air received thereby. In the illustrative embodiment shown in FIG. 3, the height of each hood 34a, 34b extends along the length of the respective oxidizer unit 32a, 32b so as to completely enclose the outlet of the respective oxidizer unit 32a, 32b. Each output hood 34a, 34b in FIG. 3 includes a top cover 35a that extends outwardly and downwardly from the hood's uppermost end, at an angle relative to the length of the respective oxidizer unit 32a, 32b, to an outlet 35b formed near the hood's lowermost end. Each hood 34a, 34b also includes a bottom wall 35c extending outwardly from the bottom end of the respective oxidizer unit 32a, 32b, to define the lowermost end of the hood 34a, 34b, and two opposing sidewalls 35d, 35e connecting the top cover 35a with the bottom wall 35c. As can be seen from FIG. 3, the outlet 35b of each hood 34a, 34b is formed by the top cover 35a, the sidewalls 35d, 35e and the bottom wall 35c of the hood. As shown in FIG. 2, in certain embodiments, the output hood 34a, 34b also includes a T-shaped output duct extender 35f coupled with the outlet 35b. The duct extender 35f has two outlets extending beyond the fuel cell stacks and is used to direct the oxidant gas outputted from the oxidizer assembly 6 around the fuel cell stacks 2a-d. The duct extender 35f visible in FIG. 2 extends between and slightly beyond the first and second stacks 2a, 2b and the two outlets of the duct extender 35f direct the flow of oxidant gas from the oxidizer assembly around the first and second stacks 2a, 2b. The duct extender disposed between the stacks 2c, 2d, which not visible in FIG. 2, has the same construction as the duct extender 35f and is used to direct the flow of oxidant gas from the oxidizer assembly around the third and fourth stacks 2c, 2d. The use of duct extenders 35f as shown in FIG. 2 allows the oxidant gas outputted from the oxidizer assembly 6 to be evenly distributed throughout the containment structure so as to avoid temperature fluctuations within the containment structure.

In other embodiments, the outlet 35b may include side flaps 35f formed as extensions of the sidewalls 35d, 35e and angled into the outlet 35b so as to promote mixing between the oxidant gas from the oxidizer unit and the secondary air and to direct the cooled oxidant gas to flow between the fuel cell stacks 2a-d.

As discussed herein above, the secondary air is conveyed to each hood 34a, 34b of each oxidizer assembly 6 by the secondary air conduit assembly 26. The conduit assembly 26 conveying secondary air from the secondary air inlet 16a to the first output hood 34a has substantially the same configuration as the conduit assembly 26 conveying secondary air from the secondary air inlet 16b to the second output hood 34b. Each conduit assembly 26 includes an inlet conduit 26a coupled at one end with the respective secondary air inlet 16a, 16b, an insulated conduit 26b coupled with the other end of the inlet conduit 26a, and a plurality of Sparger tubes 26c adapted to receive secondary air from the insulated conduit 26b and to convey the secondary air to the respective output hood 34a, 34b of the oxidizer assembly 6. As shown in FIG. 3, the inlet conduit 26a and the insulated conduit 26b of the secondary air conduit assembly 26 are arranged so that the secondary air is dropped down and conveyed below the primary air conduit 24. In particular, the inlet conduit 26a, which receives the secondary air from the respective inlet 16a, 16b, extends in a downward direction from the inlet 16a, 16b so as to convey the secondary air under the primary air conduit 24 to the insulated conduit 26b disposed in, and passing through, the base section 10a of the containment structure 10.

After passing through the insulated conduit 26b, the secondary air is conveyed to one or more Sparger tubes 26c, each of which is coupled to the insulated conduit 26b at one end and extends in an upward direction therefrom so that the second end of each Sparger tube 26c extends into the respective output hood 34a, 34b of the oxidizer assembly 6. In the illustrative embodiment shown in FIG. 3, the Sparger tubes 26c enter the hood 34a, 34b through the bottom wall 35c of the hood near an outlet of the respective oxidizer unit 32a, 32b and extend to the uppermost end of the top cover 35a of the hood 34a, 34b so as to provide uniform distribution of secondary air into the hood 34. In certain embodiments, the Sparger tubes 26c in FIG. 3 may extend into the hood 34a, 34b from different angles to further promote uniform distribution of secondary air in the hood and mixing of secondary air with the oxidant gas.

In certain embodiments, the second end of each Sparger tube 26c which extends inside the respective output hood 34a, 34b includes a plurality of small apertures through which the secondary air shoots out into the hood 34a, 34b. The small apertures promote mixing of the secondary air with the oxidant gas from the oxidizer 32, and also prevent the oxidant gas from entering the Sparger tubes. As shown in FIG. 3, each conduit assembly 26 includes four Sparger tubes 26c coupled to the insulated conduit 26b and extending into the respective output hood 34a, 34b. However, the number of the Sparger tubes 26c may vary depending on the size and configuration of the oxidizer assembly 6.

In order to promote uniform gas flow distribution within the assembly 1, the respective conduits 26a, 26b, 26c of the conduit assembly 26 that couple the first secondary air inlet 16a with the first output hood 34a of the oxidizer assembly and the respective portions 26a, 26b, 26c of the conduit assembly 26 that couples the second secondary air inlet 16b with the second output hood 34b of the oxidizer assembly have equal, or substantially equal, lengths.

As shown in FIGS. 1-4, this illustrative embodiment of the assembly 1 includes four fuel cell stacks 2a-2d symmetrically arranged and supported by the base 10a of the containment structure 10. As mentioned herein above, the oxidizer assembly 6 is also supported by the base 10a and is disposed centrally of the stacks 2a-2d and generates oxidant gas from the anode exhaust, primary air and secondary air for use by the stacks 2a-2d. As can be appreciated, each of the fuel cell stacks 2a-2d includes an anode side which receives fuel input through the fuel inlet 12 and outputs anode exhaust and a cathode side which receives cooled oxidant gas outputted from the oxidizer assembly 6 and outputs cathode exhaust.

Each of the fuel cell stacks 2a-2d has opposing first and second faces 51 and 52 associated with fuel gas flow through the anode side of the stack and opposing third and fourth faces 53 and 54 associated with oxidant gas flow through the cathode side of the stack. Each of the stacks 2a-2d further includes first, second and third manifolds 51, 52 and 53 which abut the stack faces 61, 62 and 63, respectively.

In the illustrative embodiment shown in FIGS. 1-4, the first face 51 of each stack 2a-2d corresponds to a fuel input side of the stack which receives fuel conveyed to the stack by the fuel inlet conduit assembly 22 and preheated in the end plate assembly of the stack. The first manifold 61 abuts the first face 51 of the stack so as to enclose and isolate the fuel inlet flow into the stack. In certain embodiments, each of the stacks 2a-d includes at least one reforming unit and at least one header coupled with the end plate assembly so that the preheated fuel is conveyed from the end plate assembly through the at least one header to the at least one reforming unit. In such embodiments, the at least one headers is enclosed by the first manifold 61 of the stack. The preheated fuel is reformed in the at least one reforming unit and thereafter outputted into the first manifold 61 as reformed fuel. An example of a reforming unit and a reforming assembly enclosed by the anode inlet manifold is disclosed in U.S. application Ser. No. 10/269,481 (published as U.S. Patent Application Publication No. 2004/0071617) and in U.S. Pat. No. 6,200,696, both of which are assigned to the same assignee herein and the disclosures of which are incorporated herein by reference.

The second face 52 of each stack 2a-2d corresponds to an anode output side of the stack which outputs anode exhaust from the anode side of the stack. The second manifold 62 abuts the second face 52 of the stack and is used for isolating the anode output side and for collecting the anode exhaust from the anode side of the stack. As shown, each anode exhaust conduit 20a-d is coupled at one end with the second manifold 62 of the respective stack 2a-2d so as to receive the anode exhaust collected in the second manifold and convey the anode exhaust to the oxidizer assembly 6.

The third face 53 of each stack 2a-2d corresponds to a cathode output side of the stack and the third manifold 63 abuts the third face 53. The cathode output side of the stack outputs cathode exhaust comprising spent oxidant gas into the third manifold 63 which collects the cathode exhaust and directs the cathode exhaust to the stack's end plate assembly.

In the end plate assembly, heat from the cathode exhaust is transferred to preheat input fuel and cooled cathode exhaust is then outputted from the end plate assembly to the respective cathode exhaust conduit 28a-d.

The fourth face 54 of each stack 2a-2d corresponds to a cathode inlet side of the stack and does not include a manifold. Instead, the fourth face 54 of each stack is open and exposed to the environment inside the containment enclosure 10b. As shown in FIGS. 2-4, the oxidizer assembly 6 outputs cooled oxidant gas through the output hoods 34a, 34b into the enclosure 10b and the cooled oxidant gas enters the cathode side of each stack 2a-2d through the open fourth side 104 of the stack from the enclosure 10b.

As shown, the fuel cell stacks 2a-2d are arranged within the containment structure 10 so that the open fourth side 54 of each stack is adjacent to or faces the outlet of one of the output hoods 34a, 34b. In the illustrative embodiment shown, the first and second stacks 2a, 2b are disposed within the containment structure 10 so that the fourth side 54 of the first stack 2a faces the fourth side of the second stack 2b and such that the fourth side of each of the first and second stacks 2a, 2b is disposed in an adjacent relationship to the first output hood 34a. Similarly, the third and fourth stacks 2c, 2d are arranged within the containment structure 10 so that the open fourth side 54 of the third stack 2c faces the fourth side 54 of the fourth stack and so that the fourth side of each of the third and fourth stacks 2c, 2d is disposed in an adjacent relationship to the second output hood 34b of the oxidizer assembly 6. In this way, cooled oxidant gas outputted from the first output hood 34a is directed to the cathode inlet side of the first and second stacks and cooled oxidant gas outputted from the second output hood 34b is directed to the cathode inlet side of the third and fourth stacks.

As shown in FIGS. 1-4, the stacks 2a-2d are also arranged so that the second face 102 of the first stack 2a faces the second face 52 of the fourth stack 2d, and the second face 52 of the second stack 2b faces the second face 52 of the third stack 2c. In this way, the dimensions of the conduits 20a-d can be optimized so as to provide the anode exhaust collected in the anode exhaust manifolds 62 of the stacks 2a-2d directly to the oxidizing assembly 6.

As mentioned herein above, the fuel supplied to each of the stacks 2a-2d is first preheated in the end plate assembly using heat from cathode exhaust outputted from the cathode side of the stack. In the illustrative embodiment shown in FIGS. 1-4, each stack 2a-2d includes a lower end plate assembly adapted to receive input fuel and cathode exhaust and to carry the input fuel and cathode exhaust in heat exchange relationship so that heat is transferred from the cathode exhaust to preheat the input fuel. Although not shown for purposes of simplicity and clarity, each end plate assembly includes an inlet area coupled with the respective conduit 22b1, 22b2, 22c1, 22c2 for receiving fuel delivered to the stack and a passage for carrying the fuel to the first face of the respective stack 2a-2d. Each end plate assembly also includes an inlet area which is overlapped by, and receives cathode exhaust from, the respective cathode exhaust manifold 203 and a passage for carrying the cathode exhaust to the respective cathode exhaust conduit 28a-d. An example of a suitable end plate assembly that can be used in each of the stacks 2a-2d is disclosed in commonly-owned U.S. Pat. Nos. 7,070,874 and 7,323,270, the entire disclosures of which are hereby incorporated by reference.

As described herein above, the embodiment of the modular multi-stack fuel cell assembly shown in FIGS. 1-4 incorporates the oxidizer assembly inside the containment structure so as to provide a more compact and space efficient assembly and to eliminate the need for an external oxidizer. The configuration of the assembly in FIGS. 1-4 also increases thermal efficiency of the oxidizer assembly and of the stacks, thus improving the overall performance of the modular multi-stack fuel cell assembly. In addition, the modular multi-stack fuel cell assembly shown in FIGS. 1-4 reduces the number of manifolds required for isolating the inlet and outlet gases, thus simplifying the multi-stack arrangement within the containment structure and providing manufacturing and operating cost savings.

Figure 7:
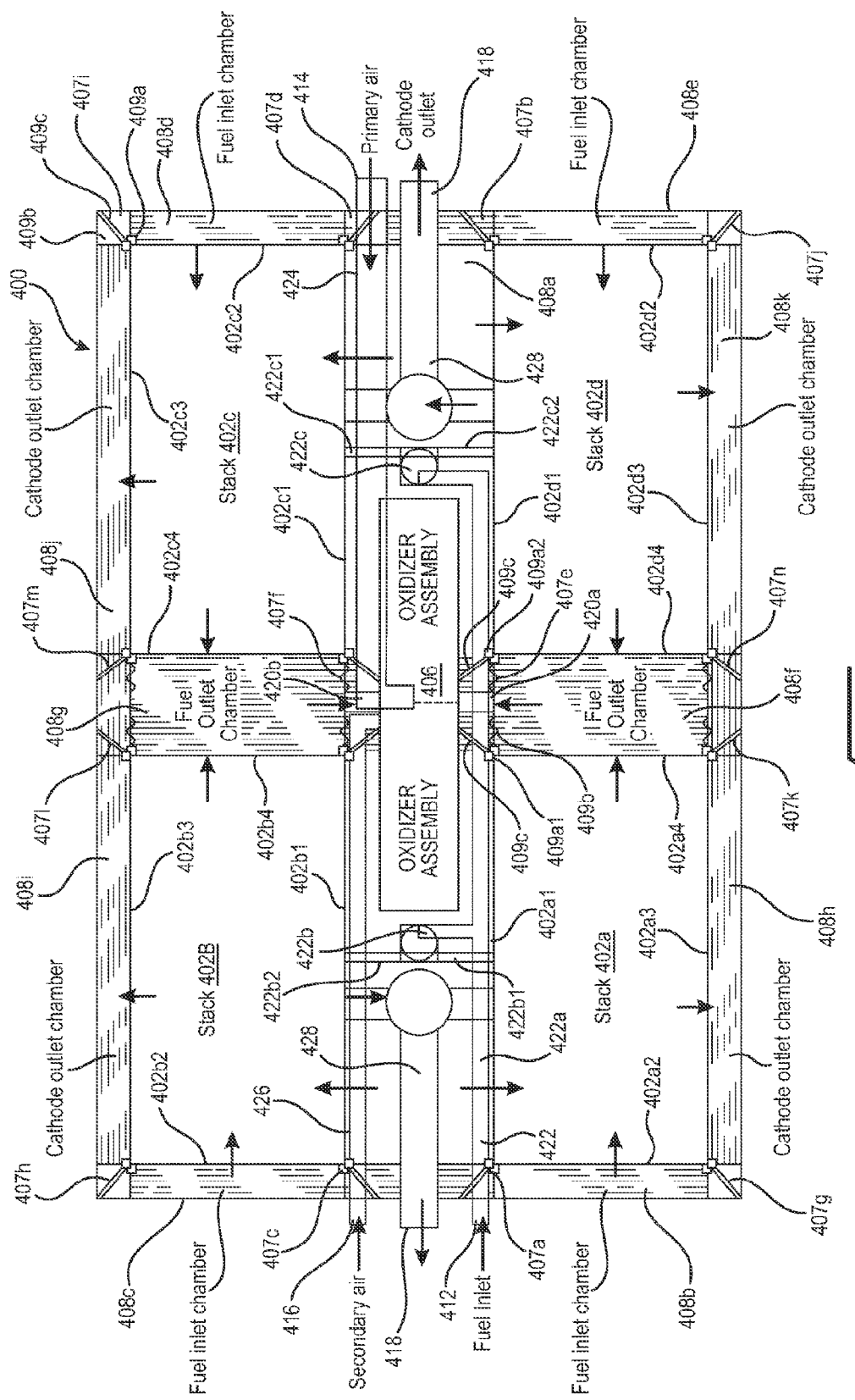
FIG. 7 shows a schematic view of another embodiment of a modular multi-stack assembly including four fuel cell stacks housed by a containment enclosure that forms a plurality of sealed areas.

The assembly shown in FIGS. 1-4 may be modified so as to further reduce the number of manifolds or to eliminate the manifolds from the stacks altogether. FIGS. 5 and 7 show illustrative embodiments of modular multi-stack fuel cell assemblies in which a sealing assembly is used to isolate fuel and oxidant inlet and outlet gases of the fuel cell, thus eliminating the need for manifolds.

FIG. 5 shows a top view of an illustrative embodiment of a modular multi-stack fuel cell assembly 100 which includes two fuel cell stacks 102, shown as stacks 102a, 102b, an oxidizer assembly 106 and a sealing assembly 107 for isolating fuel inlet, fuel outlet, oxidant inlet and oxidant outlet gases from one another. The fuel cell stacks 102a, 102b, the oxidizer assembly 106 and the sealing assembly 107 are all housed within a common containment structure 110 which includes a base section and an upper enclosure, and the sealing assembly 107 forms a plurality of seals between the fuel cell stacks and the containment structure 110 so as to form a plurality of sealed chambers within the containment structure 110. As discussed in more detail herein below, the sealed chambers eliminate the need for manifolds and thus, the fuel cell stacks 102a, 102b do not include any manifolds.

As in the embodiment shown in FIGS. 1-4, the stacks 102a, 102b in the embodiment of FIG. 5 extend height-wise in the vertical direction and are supported by the base section of the containment structure 110. The fuel cell stacks 102a, 102b are adapted to receive fuel and oxidant gas and to output anode exhaust and cathode exhaust. Each fuel cell stack 102a, 102b has a cathode inlet face 102a1, 102b1, an anode inlet face 102a2, 102b2, a cathode outlet face 102a3, 102b3 and an anode outlet face 102a4, 102b4.

The oxidizer assembly 106 is disposed centrally relative to the stacks 102a, 102b and is adapted to receive anode exhaust outputted by the stacks 102a, 102b and to produce oxidant gas for use in the stacks 102a, 102b. As in the embodiment of FIGS. 1-4, the oxidizer assembly 106 also receives primary air for mixing with the anode exhaust in the assembly 106 and for generating the oxidant gas, and secondary air for cooling the oxidant gas generated by the assembly 106 before outputting the cooled oxidant gas for use in the cathode side of the fuel cell stacks 102a, 102b. In order to facilitate the delivery of oxidant gas from the oxidant assembly 106 to the fuel cell stacks 102a, 102b, the stacks 102a, 102b are disposed within the containment structure 110 so that the cathode inlet face 102a1, 102b1 of each stack faces the oxidizer assembly 106. In the illustrative embodiment of FIG. 5, the stacks 102a, 102b are arranged so that the cathode inlet face 102a1 of the first stack 102a faces and the cathode inlet face 102b1 of the second stack 102b, with the oxidizer assembly 106 disposed in the space between the two cathode inlet faces 102a1, 102b1.

As shown, the cathode outlet face 102a3 of the first stack 102a is on opposite side of the stack 102a relative to the cathode inlet face 102a1, and the cathode outlet face 102b3 of the second stack 102b is on opposing side of the stack 102b relative to the cathode inlet face 102b1. In this way, the cathode outlet faces 102a3, 102b3 of the first and second stacks face opposing sidewalls of the containment structure 110. The anode inlet face 102a2 and the anode outlet face 102a4 of the first stack 102a form opposing faces of the stack 102a which join the cathode inlet and outlet faces 102a1, 102a3 of the first stack 102a. Similarly, the anode inlet face 102b2 and the anode outlet face 102b4 of the second stack form opposing faces of the second stack 102b which join the cathode inlet 102b1 and cathode outlet 102b3 faces of the second stack 102b. Thus, in the illustrative embodiment of FIG. 5, the anode inlet faces 102a2 and 102b2 of the first and second stacks 102a, 102b and the anode outlet faces 102a4, 102b4 of the stacks 102a, 102b face opposing sidewalls of the containment structure which join the sidewalls facing the cathode outlet faces 102a3, 102b3 of the stacks.

As shown in FIG. 5, the sealing assembly 107 of the modular multi-stack fuel cell assembly 100 comprises a plurality of seals 107a-h that form a plurality of sealed chambers 108a-g within the containment structure 110 between the walls of the containment structure 110 and the corners of the stacks 102a, 102b. In particular, the seals 107a-h form a cathode inlet chamber 108a, anode inlet chambers 108b, 108c, cathode outlet chambers 108d and 108e and anode outlet chambers 108f and 108g. As discussed in more detail herein below, each seal 107a-h has a flexible design and configuration, and includes a seal press assembly 109a which is adapted to be positioned at, or applied to, the corner of the respective stack, at least one separation member 109b sealingly coupled between the seal press assembly 109a and one of a wall of the containment structure and a seal press assembly of another seal, and a spring member 109c for applying a force between the wall of the containment structure 110 and the seal press assembly 109a so as to sealingly retain the seal press assembly against the respective stack corner.

As shown in FIG. 5, the cathode side inlet chamber 108a is formed in the central portion of the modular stack assembly so that the cathode inlet faces 102a1, 102b1 open into the chamber 108a, and so that the chamber 108a houses therein the oxidizer assembly 106 that outputs oxidizing gas to cathode inlet faces 102a1, 102b1. As shown, the periphery of the cathode inlet chamber 108a, when viewed from above, is defined by the cathode inlet faces 102a1, 102b1 of the stacks and the seals 107a-d which are disposed between the innermost corners of the first and second stacks 102a, 102b adjacent to the cathode inlet faces 102a1, 102b1 of the stacks and the walls of the containment structure 110. The cathode inlet chamber 108a replaces the need for separate manifolds to cover the cathode inlet faces of the stacks 102a, 102b and thus, the cathode inlet face of each stack 102a, 102b opens into the chamber 108a without using a separate manifold.

The anode inlet chamber 108b of the first fuel cell stack 102a is formed by the seals 107a and 107e between the anode inlet face 102a2 of the stack 102a and a wall portion of the containment structure that extends along and faces the anode inlet face 102a2. The anode outlet chamber 108f of the first fuel cell stack 102a is formed by the seals 107b and 107g between the anode outlet face 102a4 and an opposing wall portion of the containment structure which extends along and faces the anode outlet face 102a4.

Similarly, the anode inlet chamber 108c of the second fuel cell stack 102b is formed by the seals 107c and 107f between the anode inlet face 102b2 of the stack 102b and a wall portion of the containment structure that extends along and faces the anode inlet face 102b2. The anode outlet chamber 108g of the second fuel cell stack 102b is formed by the seals 107d and 107h between the anode outlet face 102b4 and an opposing wall portion of the containment structure extending along and facing the anode outlet face 102b4.

The cathode outlet chamber 108d of the first fuel cell stack 102a is formed by the seals 107e and 107g between the cathode outlet face 102a3 of the stack and the wall of the containment structure that is adjacent to and joins the wall portions defining the anode inlet and anode outlet chambers 108b, 108f. The cathode outlet chamber 108e of the second fuel cell stack 102b is formed by the seals 107f and 107h between the cathode outlet face 102b3 of the stack and the opposing wall of the containment structure which is adjacent to and joins the wall portions of the containment structure that define the anode inlet and outlet chambers 108c and 108g.

The configurations and arrangement of the seals 107a-107h will now be described. As shown in FIG. 5, the seals 107a and 107c are formed at opposing innermost corners of the first and second stacks 102a, 102b, i.e. the corners of the first and second stacks that face the inner or central area within the containment structure and which are adjacent to the cathode inlet face 102a1, 102b2 of the respective stack. Each seal 107a, 107c includes a seal press assembly 109a positioned against the respective corner of the stack, a first separation member 109b1 sealingly coupled between the seal press assembly and the nearest wall of the containment structure 110, and a spring member 109c for applying a tension force between the wall of the containment structure and the respective seal press assembly so as to sealingly retain the seal press assembly against the respective corner of the stack. In addition, a second separation member 109b2 is provided between the seal press assemblies 109a of the seals 107a and 107c, one end of the second separation member 109b2 coupling with the seal press assembly 109a of the seal 107a and the other end of the second separation member 109b2 coupling with the seal press assembly of the seal 107c. As shown, the first separation member 109b1 of each seal 107a, 107b is substantially perpendicular to the second separation member 109b2, and the spring member 109c of each seal 107a, 107c is disposed in the space between the respective first separation member 109b1 and the second separation member 109b2 so that the spring force is applied at about 45-degree angle with respect to the positions of the respective first and second separation members.

The arrangement of the seals 107b and 107d at the other opposing innermost corners of the first and second stacks 102a, 102b is similar to the arrangement of the seals 107a, 107c. As shown, each of the seals 107b, 107d includes the seal press assembly 109a positioned against the respective corner of the stack and sealingly retained against the respective corner by the spring member 109c which applies a force between the seal press assembly 109a and the nearest wall of the containment structure 110. Each of the seals 107b, 107d also includes the first separation member 109b1 which is sealingly coupled between the seal press assembly and the nearest wall of the containment structure 110. In addition, the second separation member 109b2 is provided between the seal press assemblies of the two seals 107b, 107d.

The seals 107e, 107g, 107f and 107h have similar configurations, each of the seals 107e-h being formed at one of the outer corners of the first and second stacks that faces a respective corner of the containment structure 110. As shown, the seals 107e and 107f are formed at opposing outer corners of the first and second stacks 102a, 102b, so that each seal separates the respective anode inlet face 102a2, 102b2 of the stack from the respective cathode outlet face 102a3, 102b3 of the stack and forms a seal between the anode inlet chamber 108b, 108c and the cathode outlet chamber 108d, 108e. As shown, each seal 107e, 107f is formed between the respective outer corner of the stack and the nearest respective corner of the containment structure 110, and includes the seal press assembly 109a positioned at the respective outer corner of the stack 102a, 102b between the respective anode inlet face 102a2, 102b2 and the respective cathode outlet face 102a3, 102b3, and the spring member 109c that applies a force between the respective corner of the containment structure and the respective outer corner of the stack 102a, 102b. Each seal 107e, 107f also includes two separation members 109b which are sealingly coupled between the seal press assembly 109a and walls of the containment structure 110. As shown, the two separation members 109b of each seal 107e, 107f are disposed substantially perpendicular to one another so that one of the separation members is coupled between the respective seal press assembly 109a and the wall of the containment structure that faces the anode inlet face 102a2, 102b2, while the other separation member is coupled between the respective seal press assembly 109a and the wall of the containment structure facing the cathode outlet face 102a3, 102b3.

As also shown in FIG. 5, the seals 107g and 107h are formed at the other opposing outer corners of the first and second stacks 102a, 102b, so that each seal 107g, 107h separates the respective cathode outlet face 102a3, 102b3 of the stack from the respective anode outlet face 102a4, 102b4 of the stack and forms a seal between the respective cathode outlet chamber 108d, 108e and the respective anode outlet chamber 108f, 108g. Each seal 107g and 107h is formed between the respective outer corner of the stack and the nearest respective corner of the containment structure 110, and includes the seal press assembly 109a positioned at the respective outer corner of the stack 102a, 102b, the spring member 109c that applies a force between the corner of the containment structure and the respective outer corner of the stack 102a, 102b, and two separation members 109b, which are sealingly coupled between the seal press assembly 109a and the containment structure 110. As shown, the two separation members 109b of each seal 107g, 107h are disposed substantially perpendicular to one another so that one of the separation members is coupled between the respective seal press assembly 109a and the wall of the containment structure facing the cathode outlet face 102a3, 102b3, while the other separation member is coupled between the respective seal press assembly 109a and the wall of the containment structure facing the anode outlet face 102a4, 102b4.

Figure 6B:
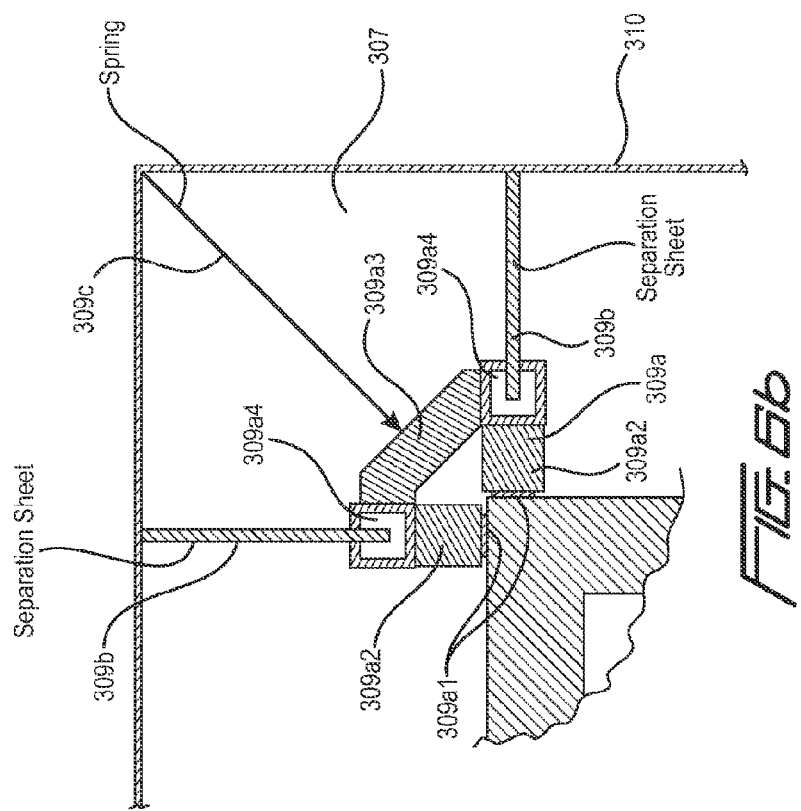
FIG. 6B shows a detailed view of another configuration of a sealing assembly used in the modular multi-stack fuel cell assembly of FIG. 5.
Figure 6A:
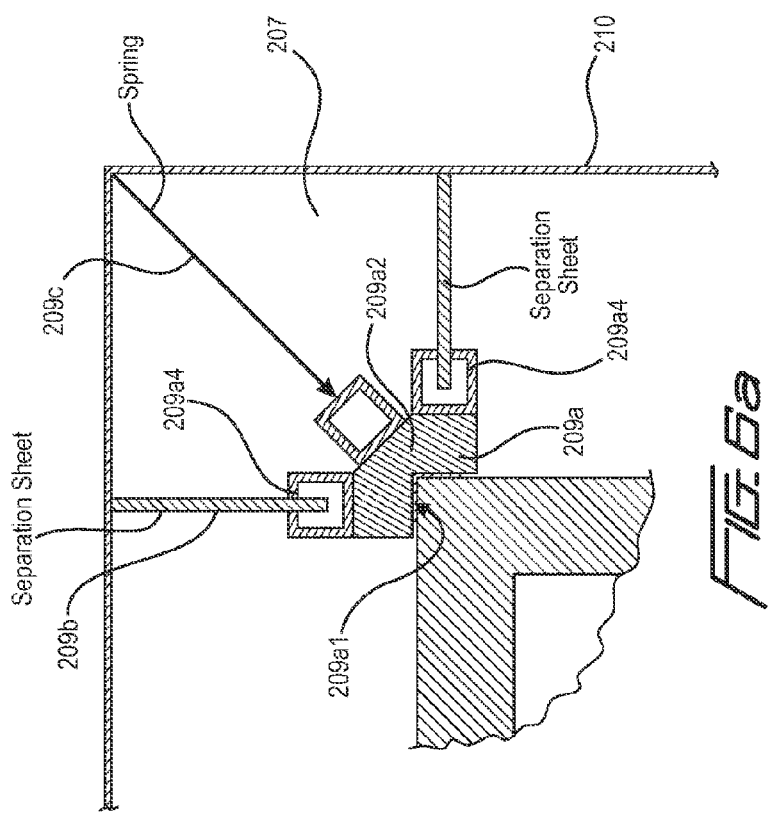
FIG. 6A shows a detailed view of one configuration of a sealing assembly used in the modular multi-stack fuel cell assembly of FIG. 5.

Detailed constructions of the seals which can be used to form the plurality of sealed chambers 108a-g in the assembly of FIG. 5 are shown in FIGS. 6A and 6B. FIG. 6A shows a first configuration of a seal 207 that is used in a first set of corners while FIG. 6B shows a second configuration of a seal 307 that is used in a second set of corners. The second set of corners are those where a negligible amount of leakage or exchange (e.g., <0.1%) of gases between the chambers formed by the seal in the corner is permissible during various modes of operation, while the first set of corners are those where a small amount of leakage or exchange (<1%) of gases between the two chambers formed by the seal is permissible during various modes of operation. In the embodiment shown in FIG. 5, the seals 107a, c, e and f, which isolate fuel and oxidant inlet gases, comprise the second set of corner seals 307 and have the configuration shown in FIG. 6B, and the seals 107b, d, g, h comprise the first set of corner seals 207 and have the configuration shown in FIG. 6A. However, it is understood that in other embodiments of the seals 307 and the seals 207 may be used and that in some applications the seals 207 can be used at the corners where the seals 307 are used in FIG. 5 and vice versa.

As shown in FIG. 6A, the corner seal 207 includes a seal press assembly 209a which comprises a ceramic gasket 209a1 which provides gas sealing at the corner of the stack and a dielectric isolator 209a2, wherein the dielectric isolator 209a2 is disposed between a compression assembly which includes a spring member 209c and the ceramic gasket 209a1. In the present illustrative embodiment, the ceramic gasket material comprises zirconia fibers or cloth and the dielectric isolator comprises alumina. The ceramic gasket 209a1 and the dielectric isolator 209a2 form a continuous seal along the length of the stack, isolating the two chambers from one another.

The corner seal 207 also includes two separation members or sheets 209b, each of which is coupled with the dielectric isolator of the seal press assembly 209a at one end and with a sidewall of the containment structure 210. As shown in FIG. 6A, hollow metallic tubes 209a4 with metallic pins can be used to couple the dielectric isolator 209a1 of the seal press assembly 209a with the separation sheets 209b. These tubes 209a4 may be formed from stainless steel tubing. Each separation sheet comprises a metal sheet and may include folds therein which provide compliance thereto during movement and/or shrinking of the stacks. The separation sheets 209b are perpendicular, or substantially perpendicular, to one another so that one separation sheet is coupled with a first sidewall of the containment structure 210, while the other separation sheet is coupled with another sidewall of the containment structure that is adjacent to the first sidewall.

The seal 207 further includes the spring member 209c which applies a force between the nearest corner of the containment structure 210 and the seal press assembly 209a so as to sealingly retain the seal press assembly 209a against the corner of the stack. The dielectric isolator 209a2 converts the force from the spring member 209c into normal forces on the sealing surfaces in the corner. As mentioned herein above, the two chambers that are separated and sealed using the corner seal 207 of FIG. 6A may exchange a small amount of gas through their common seal.

As shown in FIG. 6B, the corner seal 307 includes a seal press assembly 309a which comprises ceramic gaskets 309a1, dielectric isolators 309a2, each of the dielectric isolators corresponding to a sealing surface, and a force redistribution assembly 309a3 which provides normal forces on each sealing surface. In the illustrative embodiment shown in FIG. 6B, the ceramic gaskets are formed from zirconia fibers or cloth while the dielectric isolators 309a2 are formed from alumina. The force redistribution assembly 309a3 in this illustrative embodiment is formed from welded or cast solid metallic bars. As shown, hollow metallic tubes 309a4 with metallic pins are used to couple the dielectric isolators 309a2 of the seal press assembly 309a to the separation sheets 309b. Both the ceramic gasket 309a1 and the dielectric isolators 309a2 form a continuous seal for each sealing surface along the length of the stack, isolating the two chambers from each other and also from the gas outside both of the chambers.

The corner seal 307 also includes two separation sheets 309b, each of which is coupled with the force redistribution assembly 309a3 and the dielectric isolator 307a2 of the seal press assembly 309a via the hollow metallic tube 309a4 at one end and with a sidewall of the containment structure 310. The separation sheets 309b are perpendicular, or substantially perpendicular, to one another so that one separation sheet is coupled with a first sidewall of the containment structure 310, while the other separation sheet is coupled with another sidewall of the containment structure that is adjacent to the first sidewall.

The seal 307 also includes a spring member 309c for applying a force between the nearest corner of the containment structure 310 and the force redistribution assembly 309a3 of the seal press assembly 309a which sealingly retains the seal press assembly 309a against the corner of the stack. The force redistribution assembly 309a3 in the seal press assembly 309a converts the force from the spring member into normal forces on the sealing surfaces in the stack corner.

In the corner seals 307, the two chambers that are sealed by this seal press assembly 309a each have an individual seal area that includes a gasket 309a1 and a dielectric isolator 309a2, and thus, the two chambers do not share a common seal area at the stack corner. The space between the two sealing areas is a dead space and both chambers can exchange gases with this space outside the chambers. Because there is no common seal area in the corner seals 309, the likelihood of exchanging gases between the two chambers is reduced.

Referring now back to FIG. 5, the seals 107a-h, as described herein above, form a plurality of sealed chambers 108a-g which replace the anode inlet, anode outlet, cathode inlet and cathode outlet manifolds typically used in conventional fuel cell stacks. As discussed above, in the embodiment shown in FIG. 5, the cathode inlet faces 102a1, 102b1 of the stacks 102a, 102b open into the cathode inlet chamber 108a and are adapted to receive oxidant gas generated in the oxidizer assembly 106, which is disposed within the cathode inlet chamber 108a. The anode inlet chambers 108b and 108c enclose the anode inlet faces 102a2, 102b2, respectively, and isolate the fuel flowing to the anode side of the each stack 102a, 102b. The anode outlet chambers 108f and 108g enclose the anode outlet faces 102a4, 102b4, respectively, and are used for collecting anode exhaust outputted from the anode side of the respective stack 102a, 102b and to output the collected anode exhaust to the oxidizer assembly 106 for use in generating oxidant gas. The cathode outlet chambers 108d, 108e enclose the cathode outlet faces 102a3, 102b3, respectively and are used to collect cathode exhaust outputted from the cathode side of the respective stack 102a, 102b and to output or direct the collected cathode exhaust through an end plate assembly of the respective fuel cell stack 102a, 102b before the cathode exhaust is outputted from the modular fuel cell stack assembly 100.

In the illustrative embodiment of FIG. 5, the containment structure 110 comprises a plurality of inlet ports for receiving inlet fuel for use in the anode sides of the fuel cell stacks 102a, 102b and air for use in the oxidizer assembly 106, and outlet ports for outputting cathode exhaust produced by the stacks 102a, 102b. As shown, the containment structure includes a fuel inlet port 112 for receiving and inputting fuel into the assembly 100, a primary air inlet port 114 for receiving and inputting primary air, a secondary air inlet port 116 for receiving and inputting secondary air and one or more cathode exhaust outlet ports 118 for outputting cathode exhaust from the assembly 100. As in the embodiments shown in FIGS. 1-4, the number of inlet and outlet ports may vary depending on the configuration and requirements of the fuel cell stacks and the oxidizer assembly. In addition, although not shown in FIG. 5, the inlet ports may be formed as a port assembly in one of the sidewalls of the containment structure and may include an inlet tombstone or inlet port supporting structure for supporting the inlet ports 112, 114 and 116, and the outlet ports 118 may be formed as an outlet port assembly in the same face or another face of the containment structure and may include an outlet tombstone, or outlet port supporting structure.

As shown, the assembly 100 also includes a conduit assembly comprising piping or conduits for coupling the inlet and outlet ports 112, 118 with the respective portions of the fuel cell stacks 102a, 102b and piping and conduits for coupling the inlet ports 114, 116 with the oxidizer assembly 106. In particular, the conduit assembly includes a fuel inlet conduit assembly 122 for coupling the fuel inlet port 112 with the stacks 102a, 102b, an anode exhaust conduit assembly 120 for coupling the anode outlet chambers 108f, 108g with the oxidizer assembly 106, a primary air conduit assembly 124 and a secondary air conduit assembly 126 for coupling the primary air inlet 114 and the secondary air inlet 116, respectively, with the oxidizer assembly 106, and a cathode exhaust conduit assembly 128 for coupling the stacks 102a, 102b with the cathode outlet ports 118.

As shown, inlet fuel supplied to the assembly 100 through the fuel inlet port 112 is conveyed to the first and second stacks 102a, 102b through the fuel inlet conduit assembly 122, which first receives the fuel from the inlet port 112 through a first conduit 122a and which is then divided or split into two conduits 122b and 122c. The conduit 122b conveys its respective fuel portion to the first stack 102a while the conduit 122c conveys its respective fuel portion to the second stack 102b. The conduits 122b and 122c preferably have equal, or substantially equal lengths so as to promote equal fuel distribution to the stacks. Fuel received by each of the stacks 102a, 102b through the respective conduit 122b, 122c is first passed through the end plate assembly (not shown for purposes of clarity and simplicity) of the respective stack, where it is preheated by the cathode exhaust. Preheated fuel is then conveyed from the end plate assembly of the respective stack to the respective anode inlet chamber 108b, 108c.

After passing through the anode side of the stack, spent fuel is outputted through the anode outlet face 102a4, 102b4 of each stack 102a, 102b as anode exhaust and collected in the respective anode outlet chamber 108f, 108g. The anode exhaust is then conveyed from the respective anode outlet chamber 108f, 108g to the oxidizer assembly 106 through the anode exhaust conduit assembly 120. The anode exhaust conduit assembly 120 includes a first anode exhaust conduit 120a for conveying anode exhaust outputted from the first stack 102a and a second anode exhaust conduit 120b for conveying anode exhaust from the second stack 102b, wherein the first and second anode exhaust conduits 120a, 120b preferably have equal or substantially equal lengths.

As mentioned herein above, the oxidizer assembly 106 also receives primary air which is conveyed through the primary air conduit assembly 124 from the primary air inlet port 114, and secondary air, which is conveyed through the secondary air conduit assembly 126 from the secondary air inlet port 116. The construction of the oxidizer assembly 106 is similar to that of the oxidizer assembly 6 shown in FIGS. 1-4 and thus, details of the oxidizer assembly 106 are omitted. As in FIGS. 1-4, the oxidizer assembly 106 has a height-wise configuration and includes a mixer-eductor assembly which receives anode exhaust from the anode exhaust conduit assembly 120 and primary air from the primary air conduit assembly 124 and mixes the anode exhaust and the primary air, an oxidizer unit which includes oxidizer catalyst for oxidizing the mixture of the anode exhaust and primary air to produce oxidant gas, and an oxidant output hood immediately following the oxidizer unit. Also as in the embodiment of FIGS. 1-4, the output hood of the oxidizer assembly 106 is adapted to receive secondary air from the secondary air conduit assembly 126, which includes a plurality of Sparger tubes extending into the hood. As in FIGS. 1-4, the ends of the Sparger tubes which pass through the output hood include a plurality of small apertures through which the secondary air shoots out into the output hood. The secondary air is used to cool the hot oxidant gas produced in, and being outputted from, the oxidizer unit, so that the oxidant gas outputted from the output hood of the oxidizer assembly 106 is suitable for use in the cathode side of the fuel cell stacks 102a, 102b. The oxidizer assembly 106 of FIG. 5 may be formed as two like oxidizer assemblies, as shown in FIGS. 1-4, or may instead include only one oxidizer assembly, depending on the configuration and needs of the fuel cell stacks 102a, 102b.

Cooled oxidant gas produced by the oxidizer assembly 106 is outputted into the cathode inlet chamber 108a so that it can enter the cathode side of each fuel cell stack 102a, 102b through the respective open cathode inlet face 102a1, 102a2. After being used in the cathode side of the stack, spent oxidant gas is outputted as cathode exhaust into the respective cathode outlet chamber 108d, 108e. The cathode exhaust collected in the cathode outlet chamber 108d, 108e is thereafter conveyed to the end plate assembly of the respective fuel cell stack 102a, 102b where the cathode exhaust is cooled by transferring heat to the fuel passing through the end plate assembly in a heat exchange relationship with the cathode exhaust. Cathode exhaust outputted from the end plate assembly is conveyed through the cathode exhaust conduit assembly 128 to the cathode exhaust outlet port 118 to be exhausted from the modular multi-stack assembly 100. In the illustrative embodiment shown in FIG. 5, the cathode exhaust conduit assembly includes two separate conduits of equal or substantially equal lengths, for conveying cathode exhaust produced by each of the stacks. However, in other embodiments, the conduit assembly 128 may include an additional conduit for combining the cathode exhaust from the separate conduits so as to output the combined cathode exhaust from the cathode exhaust outlet port 118.

As mentioned above, the fuel conveyed to each stack 102a, 102b is first preheated in the end plate assembly of the stack using heat from the cathode exhaust. The configuration of the end plate assemblies in this embodiment is similar to those of the end plate assemblies in FIGS. 1-4, wherein each stack includes a lower end plate assembly which receives input fuel and cathode exhaust and carries the fuel and the cathode exhaust in heat exchange relationship so that heat is transferred from the cathode exhaust to the fuel. Each end plate assembly has a fuel inlet area, which is coupled with, and receives fuel from, the respective conduit 122b, 122c, and a fuel passage for carrying the fuel through the end plate assembly to the respective anode inlet chamber 108b, 108c. Each end plate assembly also has a cathode exhaust inlet area, which is exposed to the respective cathode outlet chamber 108d, 108e and receives cathode exhaust collected in the cathode outlet chamber, and a passage for carrying the cathode exhaust therethrough to the respective cathode exhaust conduit 128. The end plate assembly disclosed in the commonly-owned U.S. Pat. No. 7,323,270 is suitable for use in the stacks 102a, 102b of the embodiment in FIG. 5.

The arrangement of the conduit assemblies 120, 122, 124, 126 and 128 shown in FIG. 5 is illustrative and it is understood that this arrangement may be varied depending on the arrangement and requirements of the stacks 102a, 102b within the containment structure 110. In addition, the number of fuel cell stacks that can be included in the modular multi-stack assembly and arranged within the containment structure is not limited to two stacks shown in FIG. 5, and the assembly 100 may include a greater number of fuel cell stacks arranged within the same containment structure.

An example of another embodiment of the modular multi-stack assembly 400 is shown in FIG. 7 in which four fuel cell stacks 402a-d are housed within the same containment enclosure or structure 410 and a plurality of sealed areas or chambers are formed between the stacks and the containment structure 410. FIG. 7 schematically shows a top view of the multi-stack assembly 400, which includes the containment structure 410 housing the fuel cell stacks 402a-402d, an oxidizer assembly 406 and a sealing assembly 407 for forming a plurality of chambers so as to isolate fuel inlet, fuel outlet, oxidant inlet and oxidant outlet gases from one another. The containment structure 410 includes a base section and an upper enclosure. The fuel cell stacks 402a-d extend heightwise in the vertical direction and are arranged on, and supported by, the base section of the containment structure so that each stack 402a-d is positioned at one of the corners of the base section. As in the embodiments shown in FIGS. 1-5, the stacks 402a-d receive fuel and oxidant gas and output anode exhaust and cathode exhaust, and each stack 402a-d includes a cathode inlet face 402a1, 402b1, 402c1 and 402d1, an anode inlet face 402a2, 402b2, 402c2 and 402d2, a cathode outlet face 402a3, 402b3, 402c3 and 402d3 and an anode outlet face 402a4, 402b4, 402c4 and 402d4.

The oxidizer assembly 406 is also supported by the base section of the containment structure 410 and is centrally disposed relative to the stacks 402a-d. The oxidizer assembly 406 receives anode exhaust gas outputted from the stacks 402a-d, primary air and secondary air, and produces oxidant gas by oxidizing the anode exhaust with the primary air. As in the other embodiments described above, the secondary air is used in the oxidizer assembly 406 to cool the oxidant gas generated by the assembly 406 before outputting the cooled oxidant gas for use in the cathode side of the stacks 402a-d. In this embodiment, the configuration of the oxidizer assembly 406 is similar to the configuration shown in FIGS. 1-4, wherein the oxidizer assembly 406 comprises two like assemblies each including a mixer-eductor assembly adapted to receive and mix anode exhaust and primary air, an oxidizer unit which includes oxidizer catalyst for oxidizing the mixture of anode exhaust and primary air to produce oxidant gas, and an oxidant output hood directly following the oxidizer unit for cooling and outputting oxidant gas for use in the stacks.

In the embodiment shown in FIG. 7, the fuel cell stacks 402a-d are arranged within the containment structure 410 so that the cathode inlet face 402a1, 402b1, 402c1 and 402d1 of each stack faces the oxidizer assembly 406. In particular, the cathode inlet faces 402a1 and 402b1 of first and second stacks 402a, 402b face one another with one of the output hoods of the oxidizer assembly 406 disposed therebetween, while the cathode inlet faces 402c1 and 402d1 of the third and fourth stacks 402c, 402d face each other with the other output hood of the oxidizer assembly 406 disposed between these faces 402c1, 402d1. This arrangement facilitates the delivery of oxidant gas from the oxidizer assembly 406 to the cathode sides of the stacks 402a-d. In addition, in order to reduce the number of seals needed and separate chambers formed within the containment structure 410 and to facilitate the delivery of anode exhaust from the stacks to the oxidizer assembly 406, the stacks 402a-d are arranged so that the anode outlet faces of opposing stacks open into a common chamber. As shown, the outlet faces 402a4, 402d4 of the first and fourth stacks 402a, 402d face one another and open into a first anode outlet chamber, while outlet faces 402b4 and 402c4 of the second and third stacks 402b and 402c face one another and open into a second anode outlet chamber.

The plurality of chambers 408a-k for isolating the fuel and oxidant inlet and outlet gases are formed using a sealing assembly 407 which includes a plurality of seals 407a-n between the fuel cell stacks 402a-d and internal walls of the containment structure 410 or between two stacks. Each of the seals 407a-d and 407g-n is formed between a corner of the respective fuel cell stack 402a-d that faces a wall of the containment structure 410 and the wall of the containment structure 410, while each of the seals 407e and 407f are formed between internally facing corners of adjacent stacks 402a-d. As in the assembly of FIG. 5, the seals 407a-n of this embodiment have flexible design and configuration, and each of the seals 407a-n includes a seal press assembly 409a which is adapted to be positioned at, or applied to, the respective stack corner, at least one separation member 409b sealingly coupled between the seal press assembly 409a and one of a wall of the containment structure and another seal press assembly, and a spring member 409c which applies a force between the seal press assembly 409a and one of the wall of the containment structure 410 and the oxidizer assembly 406 so as to sealingly retain the seal press assembly against the corner of the respective stack. Detailed configurations of the seals are shown in FIGS. 6A and 6B. For example, the seals 407k-n in the embodiment of FIG. 7 have the configuration of the seals shown in FIG. 6A, while seals 407a-j have the configuration of the seals of FIG. 6B.

As shown in FIG. 7, the seals 407a-n are used to form a common cathode inlet chamber 408a between first, second, third and fourth stacks 402a-d, first, second, third and fourth anode inlet chambers 408b-e, the first anode outlet chamber 408f between the first and fourth stacks 402a, 402d, the second anode outlet chamber 408g between the second and third stacks 402b, 402c, and first, second, third and fourth cathode outlet chamber 408h-k.

The common cathode inlet chamber 408a is formed by the seals 407a-e and encloses therein the cathode inlet faces 402a1, 402b1, 402c1, 402d1 of the stacks 402a-d and the oxidizer assembly 406 so that one of the output hoods of the oxidizer assembly 406 opens in a direction between the cathode inlet faces 402a1, 402b1 of the first and second stacks and the other output hood of the oxidizer assembly 406 opens in a direction between the cathode inlet faces 402c1, 402d1 of the third and fourth stacks.

The seals 407a and 407c are similar to the seals 107a and 107c of FIG. 5 and the seals 407b and 407d are similar to the seals 107b and 107d of FIG. 5. Each seal 407a, 407c, 407b and 407d includes a seal press assembly positioned against the respective stack corner, a first separation member sealingly coupled between the seal press assembly and the nearest wall of the containment structure, and a spring member for applying a force between the containment structure wall and the respective seal press assembly. The seals 407a, 407c include a second separation member which is coupled between the seal press assemblies of the seals 407a, 407c, and the seals 407b and 407d include a similar second separation member which is coupled between the seal press assemblies of the seals 407b, 407d.

The seals 407e and 407f are formed between innermost facing corners of the stacks 402a-d so as to isolate the cathode inlet chamber 408a from the first and second fuel outlet chambers 408f and 408g. The seal 407e is formed between the innermost facing corners of the first and fourth stacks 402a, 402d and comprises a first seal press assembly 109a1 disposed against the innermost facing corner of the first stack 402a, a second seal press assembly 109a2 disposed against the innermost facing corner of the fourth stack 402d, a separation member 109b coupled between the first and second seal press assemblies, and two spring members 109c, each of which applies a force between the oxidizer assembly and the respective seal press assembly. The seal 407f is formed between the innermost facing corners of the second and third stacks 402b, 402c and has a similar configuration as the seal 407e, including two seal press assemblies each of which is disposed against the respective innermost facing corner of the second or third stack, a separation member coupled between the seal press assemblies and two spring members, each of which applies a force between the respective seal press assembly and the oxidizer assembly.

The anode inlet chambers 408b-e are formed by the seals 407a-d and 407g-j between the respective anode inlet faces 402a2, 402b2, 402c2, 402d2 and respective wall portions of the containment structure that extend along the anode inlet faces. In particular, the first anode inlet chamber 408b is formed by the seals 407a and 407g between the anode inlet face 402a2 of the stack 402a and the wall portion of the containment structure that extends along and faces the anode inlet face 402a2. The seal 407g is formed at the outermost corner of the first stack and isolates the first fuel inlet chamber 408b from the first cathode outlet chamber 408h. The seal 407g includes a seal press assembly positioned against the outermost corner of the stack, two separating members which are substantially perpendicular to one another and are coupled between the seal press assembly and adjacent walls of the containment structure, and a spring member disposed between the two separating members to apply force between the seal press assembly and the corresponding corner of the containment structure. In the seal 407g, one of the separating members is coupled between the seal press assembly and the wall of the containment structure that faces the fuel inlet face 402a2, while the other separating member is coupled between the seal press assembly and the wall of the containment structure that faces the cathode outlet face 402a3.

The second anode inlet chamber 408c is formed by the seals 407c and 407h between the anode inlet face 402b2 of the stack 402b and the wall portion of the containment structure 410 that extends along and faces the anode inlet face 402b2. The seal 407h is formed at the outermost corner of the second stack 402b and isolates the second fuel inlet chamber 408c from the second cathode outlet chamber 408i. The third anode inlet chamber 408d is formed by the seals 407d and 407i between the anode inlet face 402c2 of the third stack 402c and the wall portion of the containment structure that extends along and faces the anode inlet face 402c2. The seal 407i is formed at the outermost corner of the third stack and isolates the third fuel inlet chamber 408d from the third cathode outlet chamber 408j. Finally, the fourth anode inlet chamber 408e is formed by the seals 407b and 407j between the anode inlet face 402d2 of the fourth stack 402d and the wall portion of the containment structure that extends along and faces the anode inlet face 402d2. The seal 407j is formed at the outermost corner of the fourth stack and isolates the fourth fuel inlet chamber 408e from the fourth cathode outlet chamber 408k. The constructions of the seals 407h, 407i and 407j are the same or substantially similar to that of the seal 407g and descriptions thereof are therefore omitted.

As mentioned herein above, the anode outlet chamber 408f and 408g are formed between the anode outlet faces of the stacks. In particular, the first anode outlet chamber 408f is formed between the anode outlet faces 402a4 and 402d4 of the first and fourth stacks 402a, 402d and is isolated from the cathode inlet chamber 408a by the seal 407e and from the first and fourth cathode outlet chambers 408h and 408k by the seals 407k and 407n. Similarly, the second anode outlet chamber 408g is formed between the anode outlet faces 402b4 and 402c4 of the second and third stacks 402b, 402c and is isolated from the cathode inlet chamber 408a by the seal 407f and from the second and third cathode outlet chambers 408i and 408j by the seals 407l and 407m. Each of the seals 407k, 407n, 407l and 407m includes a seal press assembly disposed at the respective stack corner, a separating member coupled between the seal press assembly and the closest wall of the containment structure, i.e., the wall of the containment structure that extends along the cathode outlet face of the respective stack, and a spring member which applies a force between the closest wall of the containment structure and the seal press assembly. In addition, a second separating member is provided between the seal press assemblies of the seals $407k$ and $407n$, and between the seal press assemblies of the seals $407l$ and $407m$.

As shown in FIG. 7, the first cathode outlet chamber $408h$ is formed by the seals $407g$ and $407k$ between the cathode outlet face $402a3$ and a wall portion of the containment structure that extends along the cathode outlet face $403a3$. The second cathode outlet chamber $408i$ is formed by the seals $407h$ and $407l$ between the cathode outlet face $402b3$ and a wall portion of the containment structure that extends along the cathode outlet face $403b3$. The third cathode outlet chamber $408j$ is formed by the seals $407i$ and $407m$ between the cathode outlet face $402c3$ and a wall portion of the containment structure that extends along the cathode outlet face $403c3$. The fourth cathode outlet chamber $408k$ is formed by the seals $407j$ and $407n$ between the cathode outlet face $402d3$ and a wall portion of the containment structure that extends along the cathode outlet face $403d3$.

The plurality of sealed chambers $408a\text{-}k$ formed by the seals $407a\text{-}n$, as described herein above, isolate anode and cathode inlet and outlet gases from one another and replace the anode inlet, anode outlet, cathode inlet and cathode outlet manifolds which are typically in conventional fuel cell stacks. As shown in FIG. 7, the modular multi-stack assembly 400 includes a plurality of inlet and outlet ports in the containment structure 410 through which the fuel and air are provided to the assembly 400 and through which the exhaust gases are removed from the assembly 400. The assembly 400 also includes a conduit assembly for conveying the inlet and outlet gases to and from the inlet and outlet ports and within the assembly. In particular, the containment structure includes a fuel inlet port 412 for receiving and inputting fuel into the assembly 400, a primary air inlet port 414 for receiving and inputting primary air, a secondary inlet port 416 for receiving and inputting secondary air and cathode exhaust outlet ports 418 for outputting cathode exhaust from the assembly 400. These inlet and outlet ports may be formed as one or more port assemblies in one or more faces of the containment structure 410, such as by using tombstone port support structures similar to those shown in FIGS. 1-4.

As shown, fuel is supplied to the assembly 400 though the fuel inlet port 412 and is conveyed to the fuel cell stacks $402a\text{-}d$ through a fuel inlet conduit assembly 422. The fuel inlet conduit assembly 422 receives the fuel from the inlet port 412 through a first conduit $422a$ which is divided or split into two conduits $422b$ and $422c$ which receive substantially equal portions of the fuel, and each conduit $422b$ and $422c$ is then again divided into two conduits $422b1$, $422b2$, $422c1$ and $422c2$, each of which is coupled with a respective fuel cell stack $402a$, $402b$, $402c$, $402d$ and conveys its respective fuel portion thereto. Fuel supplied to each of the stacks $402a\text{-}d$ through the respective conduit $422b1$, $422b2$, $422c1$, $422c2$ is first passed through an end plate assembly of the respective stack, where it is preheated by the cathode exhaust. Preheated fuel is then conveyed from the end plate assembly of the stack to the respective anode inlet chamber $408b\text{-}e$.

Anode exhaust outputted from the first and fourth stacks $402a$, $402d$ through their respective anode outlet faces $402a4$, $402d4$ is collected in the first anode outlet chamber $408f$, and anode exhaust outputted from the second and third stacks $402b$, $402c$ though their respective anode outlet faces $402b4$, $402c4$ is collected in the second anode outlet chamber $408g$. Anode exhaust collected in the first and second anode outlet chambers $408f$, $408g$ is then conveyed through an anode exhaust conduit assembly 420 to the oxidizer assembly 406. In the illustrative embodiment of FIG. 7, the anode exhaust conduit assembly 420 includes a first conduit $420a$ for conveying anode exhaust from the first anode outlet chamber $408f$ to the mixer-eductor assembly of the oxidizer assembly 406, and a second conduit $420b$ for conveying anode exhaust from the second anode outlet chamber $408g$ to the mixer-eductor assembly of the oxidizer assembly 406.

As discussed herein above, the anode exhaust conveyed to the mixer-eductor assembly of the oxidizer assembly 406 is mixed with primary air and oxidant gas is generated in the oxidizer unit from the mixture of the anode exhaust and primary air. Primary air is provided to the assembly through the primary air inlet port 414 and conveyed from the inlet port 414 to the mixer-eductor assembly through a primary air conduit assembly 424. As mentioned above, oxidant gas generated in the oxidizer units of the oxidizer assembly is cooled in the output hoods of the oxidizer assembly which receive secondary air supplied to the assembly through the secondary air inlet port 416 and conveyed from the inlet port 416 to the output hoods through a secondary air conduit assembly 426. As in the embodiments of FIGS. 1-5, the secondary air conduit assembly 426 in this embodiment includes a plurality of Sparger tubes which extend into the output hoods and have a plurality of small apertures or openings through which the secondary air shoots out into the hoods. Cooled oxidant gas produced in the oxidizer assembly 406 is outputted into the cathode inlet chamber $408a$ from which it can enter the cathode side of each stack $402a\text{-}d$ through the respective open cathode inlet face $402a1$, $402b1$, $402c1$, $402d1$.

Spent oxidant gas is outputted by each of the stacks as cathode exhaust into the respective cathode outlet chamber $408h\text{-}k$, where it is collected before being conveyed to the end plate assembly of the respective fuel cell stack $402a\text{-}d$. The construction of the end plate assembly is substantially similar to the construction of the end plate assembly in the embodiments of FIGS. 1-4 and to the end plate construction disclosed in commonly owned U.S. Pat. No. 7,323,270. In the end plate assembly, cathode exhaust is passed in a heat exchange relationship with the fuel so as to transfer heat to the fuel. Cooled cathode exhaust is then conveyed from the end plate assembly through a cathode exhaust conduit assembly 428 to the cathode exhaust outlet port 418 to be exhausted from the assembly 400. In the embodiment shown in FIG. 7, the cathode exhaust conduit assembly 428 has a similar configuration to the conduit assembly 28 shown in FIGS. 1-4, wherein cathode exhaust from the first and second stacks $402a$, $402b$ is conveyed to one cathode outlet port 418 and cathode exhaust from the third and fourth stacks $402c$, $402d$ is conveyed to another cathode outlet port 418.

The arrangement of the conduit assemblies 420, 422, 424, 426 and 428 shown in FIG. 7 is illustrative and it is understood that this arrangement may be varied based on the configurations, dimensions and requirements of the fuel cell stacks $402a\text{-}d$. In addition, the arrangement of the plurality of chambers may be varied and additional chambers may be formed by using additional seals.

As shown in FIGS. 5 and 7 and described herein above, the illustrative embodiments of the modular multi-stack assembly in FIGS. 5 and 7 include an oxidizer assembly 106, 406 centrally disposed within the containment structure 110, 410. However, it is understood that in other embodiments, the oxidizer assembly 106, 406 may be replaced with a distributor assembly and the arrangement of the conduit assemblies for conveying fuel and oxidant inlet and outlet gases may be modified, as disclosed in the commonly owned U.S. Pat. No. 7,323,270. In such other embodiments, a plurality of sealed chambers are formed by the sealing assembly, having the same or similar construction to the sealing assemblies 107, 407 shown in FIGS. 5 and 7, and replace the manifolds covering the faces of the stacks.

As discussed above, the plurality of sealed chambers formed within the spaces between the stacks and the walls of the containment structure or between the stacks, as shown in FIGS. 5 and 7, eliminate the need for individual manifolds to cover each stack face. The elimination of manifolds and use of flexible seals reduces the risk of gas leakage, particularly resulting from stack movement and shrinkage during operation of the assembly. In addition, maintenance of the assembly can be simplified by providing easier access to the stacks and their components within the containment structure.

Figure 8:
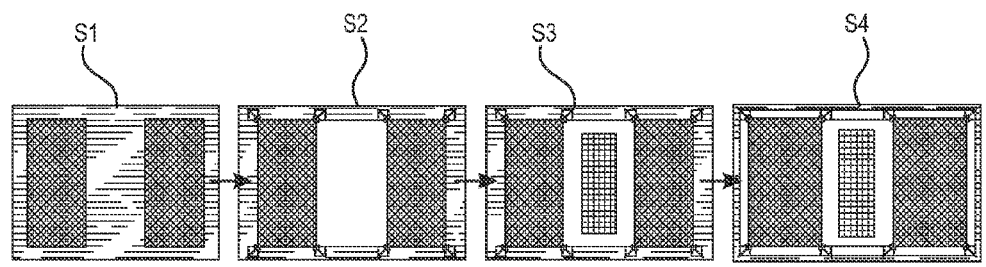
FIG. 8 illustrates a method of forming the modular multi-stack assembly of FIG. 5.

Moreover, a production assembly line may be established for mass production of modular multi-stack fuel cell assemblies shown in FIGS. 5 and 7. An example of the production line for the multi-stack assembly 100 of FIG. 5 is shown in FIG. 8, which shows steps S1-S4 of a production method for forming the multi-stack assembly 100. In a first step S1, the base portion of the containment structure 110 and the first and second stacks 102a, 102b are provided, and the stacks 102a, 102b are arranged on the base portion. In the second step S2, the seals 107a-h are applied to each corner of the two stacks 102a, 102b to be sealingly coupled with the respective walls of the containment structure and to form the chambers 108a-g between the walls of the containment structure 110 and the faces of the stacks. A lowermost end of each seal may be extended partially through the base portion of the containment structure, while an uppermost end of each seal may extend beyond the corner of the seal in an upward direction so that the uppermost end of the seal extends partially through the cover of the containment structure in order to provide additional sealing. In the next step S3, internal equipment and instruments, including the oxidizer assembly 106 and the conduit assemblies 120, 122, 124, 126 and 128, are installed within the containment structure 110. Finally, in the last step S4, the sidewalls and a top cover of the enclosure 110a of the containment structure 110 are installed. In this step, the seals 107a-h are sealingly coupled with the sidewalls and the top cover so as to form the chambers 108a-d to isolate the fuel and oxidant inlet and outlet gas flows within the assembly.

The production method of FIG. 8 can be automated for mass production of modular multi-stack assemblies. In addition, the production method shown in FIG. 8 can be modified so as to produce the assembly shown in FIG. 7 and in FIGS. 1-4. With respect to the method of producing the assembly of FIGS. 1-4, the second step S2 may be eliminated if no seals are used in the assembly of FIGS. 1-4.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A modular fuel cell stack assembly comprising:
a plurality of fuel cell stacks, each of said fuel cell stacks having a plurality of stack faces and a plurality of stack corners formed between said stack faces, wherein said plurality of stack faces include a cathode inlet face adapted to receive oxidant gas for use in a cathode side of said fuel cell stack, a cathode outlet face adapted to output cathode exhaust from said cathode side, an anode inlet face adapted to receive fuel for use in an anode side of said fuel cell stack and an anode outlet face adapted to output anode exhaust from said anode side, and wherein at least one of said cathode inlet face, cathode outlet face, anode inlet face and anode outlet face is an open face;
a common containment structure for housing and entirely enclosing said plurality of fuel cell stacks and for providing fuel and oxidant gas to said fuel cell stacks, and
a sealing assembly comprising a plurality of seals forming at least one sealed chamber for sealingly enclosing and isolating at least one said open face within said common containment structure,
wherein each of said seals is sealingly coupled between one of said fuel cell stacks and one of: (a) a wall of the common containment structure, and (b) another one of said fuel cell stacks.

2. A modular fuel cell stack assembly in accordance with claim 1, wherein, each of said seals includes a seal press assembly adapted to be applied to a stack corner adjacent said at least one said open face, a spring member for providing a force so as to retain said seal press assembly at said stack corner and at least one separating member sealingly coupled with said seal press assembly.

3. A modular fuel cell stack assembly in accordance with claim 1, wherein:
each of said cathode inlet face, said cathode outlet face, said anode inlet face and said anode outlet face is an open face; and
said containment structure includes at least one sealed cathode inlet chamber for sealingly enclosing and isolating said cathode inlet faces of said stacks, at least one sealed cathode outlet chamber for sealingly enclosing and isolating said cathode outlet faces of said stacks, at least one sealed anode inlet chamber for sealingly enclosing and isolating said anode inlet faces of said stacks, and at least one sealed anode outlet chamber for sealingly enclosing and isolating said anode outlet faces of said stacks.

4. A modular fuel cell stack assembly in accordance with claim 3, wherein each of said seals is sealingly provided between a stack corner of one of said plurality of stacks and at least one of a wall of said containment structure and another one of said plurality of stacks.

5. A modular fuel cell stack assembly in accordance with claim 4, wherein each sealed chamber is formed by seals provided at stack corners that are adjacent to said one or more stack faces being enclosed by said sealed chamber.

6. A modular fuel cell stack assembly in accordance with claim 5, wherein said cathode inlet chamber is centrally disposed within said containment structure and encloses and isolates all of said cathode inlet faces of said plurality of fuel cell stacks, said cathode inlet chamber being formed by the seals provided between stack corners adjacent to said cathode inlet faces and at least one of a wall of said containment structure and another one of said plurality of stacks.

7. A modular fuel cell stack assembly in accordance with claim 6, further comprising an oxidizer assembly adapted to receive anode exhaust outputted from said anode side of said stacks and to generate oxidant gas for use in said cathode side from said anode exhaust, wherein said oxidizer assembly is disposed centrally within said containment structure and enclosed within said cathode inlet chamber.

8. A modular fuel cell stack assembly in accordance with claim 7, wherein cathode inlet and cathode outlet faces of each fuel cell stack form opposing faces of said fuel cell stack and wherein each said cathode outlet chamber is formed at an opposing side of said fuel cell stack relative to said cathode inlet chamber.

9. A modular fuel cell stack assembly in accordance with claim 8, wherein anode inlet and anode outlet faces of each fuel cell stack form opposing faces of said fuel cell stack joining said cathode inlet and cathode outlet faces, and wherein each said anode inlet chamber is formed at an opposing side of said fuel cell stack relative to said anode outlet chamber.

10. A modular fuel cell stack assembly in accordance with claim 9, wherein said oxidizer assembly is adapted to receive a primary air portion for mixing with said anode exhaust and for generating oxidant gas and to receive a secondary air portion for cooling said oxidant gas generated by said oxidizer assembly.

11. A modular fuel cell stack assembly in accordance with claim 10, wherein said containment structure includes a plurality of inlet ports for inputting fuel, said primary air portion and said secondary air portion and at least one outlet port for outputting cathode exhaust, said modular fuel cell assembly further comprising a conduit assembly for conveying said fuel to said fuel cell stacks, conveying said anode exhaust from said one or more fuel outlet chambers to said oxidizer assembly, conveying said primary air and secondary air portions to said oxidizer assembly and conveying said cathode exhaust from said fuel cell stacks to said at least one outlet port.

12. A modular fuel cell stack assembly in accordance with claim 11, wherein said plurality of inlet ports include a fuel inlet port for inputting fuel, a primary air inlet port for inputting the primary air portion and at least one secondary inlet port for inputting the secondary air portion, and said at least one outlet port includes at least one cathode outlet port for outputting cathode exhaust, and
wherein said conduit assembly comprises a fuel inlet conduit assembly adapted to receive fuel inputted to the fuel inlet port and to convey said fuel to said plurality of fuel cell stacks, an anode exhaust conduit assembly adapted to receive anode exhaust from said anode outlet chamber and to convey said anode exhaust to said oxidizer assembly, a primary air conduit assembly adapted to receive primary air from said primary air inlet port and to convey said primary air to said oxidizer assembly, a secondary air conduit assembly adapted to receive secondary air from said secondary air inlet port and to convey said secondary air to said oxidizer assembly and a cathode exhaust conduit assembly adapted to receive cathode exhaust outputted by said fuel cell stacks and to convey said cathode exhaust to said cathode outlet port.

13. A modular fuel cell stack assembly in accordance with claim 12, wherein each of said fuel cell stacks includes an end plate assembly adapted to receive fuel from said fuel inlet conduit assembly and cathode exhaust from said cathode outlet chamber and to convey said fuel and said cathode exhaust in a heat exchange relationship so as to preheat said fuel, said end plate assembly being further adapted to output said cathode exhaust to said cathode exhaust conduit assembly and said preheated fuel to said anode inlet chamber.

14. A modular fuel cell stack assembly in accordance with claim 9, wherein each of said seals comprises a seal press assembly adapted to be sealingly applied to a stack corner adjacent said at least one said open face, a spring member for providing a force so as to retain said seal press assembly at said stack corner and at least one separating member sealingly coupled with said seal press assembly and one of a wall of said containment structure and another seal press assembly.

15. A modular fuel cell stack assembly in accordance with claim 14, wherein said seal press assembly comprises at least one ceramic gasket and at least one dielectric isolator for isolating said seal press assembly from said spring member.

16. A modular fuel cell stack assembly in accordance with claim 15, wherein said ceramic gasket comprises one of zirconia fibers and zirconia cloth, said dielectric isolator comprises alumina and said separation member comprises sheet metal.

17. A modular fuel cell stack assembly in accordance with claim 16, wherein said spring member provides a force between said seal press assembly and one of a wall of said containment structure and a wall of said oxidizer assembly.

18. A modular fuel cell stack assembly in accordance with claim 15, wherein each said seal has one of a first construction for first sealing and a second construction for second sealing,
wherein in said first construction of said seal, said seal press assembly comprises said ceramic gasket abutting said stack corner, said dielectric isolator abutting said gasket and at least one hollow metallic tube for coupling said at least one separation member and said spring member with said dielectric isolator; and
wherein in said second construction of said seal, said seal press assembly comprises at least one ceramic gasket abutting each sealing surface of said corner, at least one dielectric isolator abutting each said ceramic gasket, a force distribution assembly for applying a force to each of said dielectric isolators at least one hollow metallic tube for coupling said at least one separation member with said force distribution assembly.

19. A modular fuel cell stack assembly in accordance with claim 9, wherein said plurality of fuel cell stacks includes a first fuel cell stack having a first cathode inlet face, a first cathode outlet face, a first anode inlet face and a first anode outlet face and a second fuel cell stack having a second cathode inlet face, a second cathode outlet face, a second anode inlet face and a second anode outlet face, said first and second fuel cell stacks are disposed within said containment structure so that said first cathode inlet face faces said second cathode inlet face and said oxidizer assembly is disposed between said first and second cathode inlet faces.

20. A modular fuel cell stack assembly in accordance with claim 19, wherein said containment structure includes:
a common cathode inlet chamber for sealingly enclosing and isolating said first and second cathode inlet faces,
a first cathode outlet chamber formed at an opposing side of said first fuel cell stack relative to said cathode inlet chamber for enclosing said first cathode outlet face,
a second cathode outlet chamber formed at an opposing side of said second fuel cell stack relative to said cathode inlet chamber for enclosing said second cathode outlet face,
a first anode inlet chamber for enclosing said first anode inlet face,
a first anode outlet chamber formed at an opposing side of said first fuel cell stack relative to said first anode inlet chamber for enclosing said first anode outlet face,
a second anode inlet chamber for enclosing said second anode inlet face, and
a second anode outlet chamber formed at an opposing side of said second fuel cell stack relative to said second anode inlet chamber for enclosing said second anode outlet face.

21. A modular fuel cell stack assembly in accordance with claim 20, wherein said common cathode inlet chamber is formed by a first seal provided at a first stack corner of said first stack adjacent to said first cathode inlet face, a second seal provided at a second stack corner of said first stack adjacent to said first cathode inlet face, a third seal provided at a first corner of said second stack adjacent to said second cathode inlet face and a fourth seal provided at a second corner of said second stack adjacent to said second cathode inlet face,
- each of said first, second, third and fourth seals including a seal press assembly adapted to be applied to said respective stack corner, a spring member for providing a force between said seal press assembly and a wall of said containment structure so as to retain the seal press assembly at said respective stack corner, and a first separating member sealingly coupled between said seal press assembly and a nearest wall portion of said containment structure, and
- said first and third seals further including a first common separating member coupled between said seal press assembly of said first seal and said seal press assembly of said third seal, and said second and fourth seals further including a second common separating member coupled between said seal press assembly of said second seal and said seal press assembly of said fourth seal.

22. A modular fuel cell stack assembly in accordance with claim 21, wherein said sealing assembly further comprises:
- a fifth seal provided at a third stack corner of said first stack between said first anode inlet face and first cathode outlet face and including a seal press assembly adapted to be applied to said third stack corner, a spring member for providing a force between said seal press assembly and a wall of said containment structure so as to retain the seal press assembly at said third stack corner, a first separating member sealingly coupled between said seal press assembly and a wall portion of said containment structure facing said first anode inlet face and a second separating member sealingly coupled between said seal press assembly and a wall portion of said containment structure facing said first cathode outlet face;
- a sixth seal provided at a fourth stack corner of said first stack between said first cathode outlet face and said first anode outlet face and including a seal press assembly adapted to be applied to said fourth stack corner, a spring member for providing a force between said seal press assembly and a wall of said containment structure so as to retain the seal press assembly at said fourth stack corner, a first separating member sealingly coupled between said seal press assembly and a wall portion of said containment structure facing said first cathode outlet face and a second separating member sealingly coupled between said seal press assembly and a wall portion of said containment structure facing said first anode outlet face;
- a seventh seal provided at a third stack corner of said second stack between said second anode inlet face and second cathode outlet face and including a seal press assembly adapted to be applied to said third stack corner of said second stack, a spring member for providing a force between said seal press assembly and a wall of said containment structure so as to retain the seal press assembly at said third stack corner of said second stack, a first separating member sealingly coupled between said seal press assembly and a wall portion of said containment structure facing said second anode inlet face and a second separating member sealingly coupled between said seal press assembly and a wall portion of said containment structure facing said second cathode outlet face;
- an eighth seal provided at a fourth stack corner of said second stack between said second cathode outlet face and said second anode outlet face and including a seal press assembly adapted to be applied to said fourth stack corner of said second stack, a spring member for providing a force between said seal press assembly and a wall of said containment structure so as to retain the seal press assembly at said fourth stack corner of said second stack, a first separating member sealingly coupled between said seal press assembly and a wall portion of said containment structure facing said second cathode outlet face and a second separating member sealingly coupled between said seal press assembly and a wall portion of said containment structure facing said second anode outlet face.

23. A modular fuel cell stack assembly in accordance with claim 9, wherein said plurality of fuel cell stacks includes:
- a first fuel cell stack having a first cathode inlet face, a first cathode outlet face, a first anode inlet face and a first anode outlet face;
- a second fuel cell stack having a second cathode inlet face, a second cathode outlet face, a second anode inlet face and a second anode outlet face;
- a third fuel cell stack having a third cathode inlet face, a third cathode outlet face, a third anode inlet face and a third anode outlet face; and
- a fourth fuel cell stack having a fourth cathode inlet face, a fourth cathode outlet face, a fourth anode inlet face and a fourth anode outlet face;
- said first, second, third and fourth fuel cell stacks are disposed within said containment structure so that said first cathode inlet face is in a facing relationship with said second cathode inlet face, and said third cathode inlet face is in a facing relationship with said fourth cathode inlet face, and said oxidizer assembly is centrally disposed between said first and second cathode inlet faces and between said third and fourth cathode inlet faces.

24. A modular fuel cell stack assembly in accordance with claim 23, wherein said containment structure includes:
- a common cathode inlet chamber for sealingly enclosing and isolating said first, second, third and fourth cathode inlet faces,
- a first cathode outlet chamber formed at an opposing side of said first fuel cell stack relative to said cathode inlet chamber for enclosing said first cathode outlet face,
- a second cathode outlet chamber formed at an opposing side of said second fuel cell stack relative to said cathode inlet chamber for enclosing said second cathode outlet face,
- a third cathode outlet chamber formed at an opposing side of said third fuel cell stack relative to said cathode inlet chamber for enclosing said third cathode outlet face,
- a fourth cathode outlet chamber formed at an opposing side of said fourth fuel cell stack relative to said cathode inlet chamber for enclosing said fourth cathode outlet face,
- a first anode inlet chamber for enclosing said first anode inlet face, a second anode inlet chamber for enclosing said second anode inlet face, a third anode inlet chamber for enclosing said third anode inlet face, and a fourth anode inlet chamber for enclosing said fourth anode inlet face,
- a first common anode outlet chamber for enclosing said first anode outlet face and said fourth anode outlet face formed between said first and fourth fuel cell stacks, said first and fourth fuel cell stacks being disposed within said containment structure so that said first anode outlet face is in a facing relationship with said fourth anode outlet face, and
- a second common anode outlet chamber for enclosing said second anode outlet face and said third anode outlet face formed between said second and third fuel cell stacks, said second and third fuel cell stacks being disposed within said containment structure so that said second anode outlet face is in a facing relationship with said third anode outlet face.

25. A method of forming a modular fuel cell stack assembly of claim 1, wherein said containment structure includes a base portion, a plurality of sidewalls and a top cover, said method comprising the steps of:
providing said base portion of said containment structure and said plurality of fuel cell stacks;
arranging said plurality of fuel cell stacks on said base portion of said containment structure;
applying said plurality of seals to stack corners adjacent said at least one said open face for forming said at least one sealed chamber; and
installing said sidewalls and said top cover of said containment structure to form said at least one sealed chamber.

26. A method of forming said modular fuel cell stack assembly in accordance with claim 25, wherein:
said at least one sealed chamber includes a cathode inlet chamber for sealingly enclosing and isolating said cathode inlet faces of said fuel cell stacks; and
said modular fuel cell stack assembly further comprises an oxidizer assembly adapted to receive air and anode exhaust outputted from said anode side of said stacks and to generate oxidant gas for use in said cathode side from said anode exhaust and said air, said oxidizer assembly is disposed centrally within said containment structure and enclosed within said cathode inlet chamber, and a conduit assembly for conveying fuel to said fuel cell stacks, air and anode exhaust to said oxidizer assembly and cathode exhaust from said fuel cell stacks,
said method further comprising the step of installing said oxidizer assembly and said conduit assembly within said containment structure after applying said seals to said stack corners and before installing said sidewalls and said top cover of said containment structure.

27. A modular fuel cell stack assembly comprising:
a plurality of fuel cell stacks, each of said fuel cell stacks having a plurality of stack faces and a plurality of stack corners formed between said stack faces, wherein said plurality of stack faces include a cathode inlet face adapted to receive oxidant gas for use in a cathode side of said fuel cell stack, a cathode outlet face adapted to output cathode exhaust from said cathode side, an anode inlet face adapted to receive fuel for use in an anode side of said fuel cell stack and an anode outlet face adapted to output anode exhaust from said anode side, and wherein each of said cathode inlet face, cathode outlet face, anode inlet face and anode outlet face is an open face;
a common containment structure for housing and entirely enclosing said plurality of fuel cell stacks and for providing fuel and oxidant gas to said fuel cell stacks, wherein said common containment structure includes a plurality of sealed chambers for sealingly enclosing and isolating said cathode inlet faces, said anode inlet faces, said cathode outlet faces and said anode outlet faces, and
a sealing assembly comprising a plurality of seals for forming said sealed chambers within said common containment structure,
wherein each of said seals is sealingly coupled between one of said fuel cell stacks and one of: (a) a wall of the common containment structure and (b) another one of said fuel cell stacks, and
wherein each of said seals has one of a first construction and a second construction, said second construction providing greater sealing than said first construction.

28. A modular fuel cell stack assembly in accordance with claim 1, wherein at least one sealed chamber in the containment structure sealingly encloses and isolates a plurality of corresponding stack faces of two or more fuel cell stacks.

29. The modular fuel cell stack assembly in accordance with claim 27, wherein at least one sealed chamber of the plurality of sealed chambers encloses and isolates a plurality of corresponding stack faces of two or more fuel cell stacks.

30. The modular fuel cell stack assembly in accordance with claim 1, wherein the common containment structure encloses all surfaces of the plurality of fuel cell stacks.

31. The modular fuel cell stack assembly in accordance with claim 27, wherein the common containment structure encloses all surfaces of the plurality of fuel cell stacks.

* * * * *